United States Patent
Martin

(10) Patent No.: US 7,289,113 B2
(45) Date of Patent: *Oct. 30, 2007

(54) PROJECTION DISPLAY SYSTEM WITH PRESSURE SENSING AT SCREEN, AND COMPUTER ASSISTED ALIGNMENT IMPLEMENTED BY APPLYING PRESSURE AT DISPLAYED CALIBRATION MARKS

(75) Inventor: David A. Martin, Calgary (CA)

(73) Assignee: Smart Technologies Inc. (CA)

( * ) Notice: Subject to any disclaimer, the term of this patent is extended or adjusted under 35 U.S.C. 154(b) by 322 days.

This patent is subject to a terminal disclaimer.

(21) Appl. No.: 10/832,281

(22) Filed: Apr. 27, 2004

(65) Prior Publication Data

US 2004/0263488 A1    Dec. 30, 2004

Related U.S. Application Data

(63) Continuation of application No. 09/989,154, filed on Nov. 11, 2002, now Pat. No. 6,747,636, which is a continuation of application No. 09/595,976, filed on Jun. 16, 2000, now Pat. No. 6,337,681, which is a continuation of application No. 08/477,498, filed on Jun. 7, 1995, now Pat. No. 6,141,000, which is a continuation of application No. 07/780,052, filed on Oct. 21, 1991, now Pat. No. 5,448,263.

(51) Int. Cl.
*G06F 3/041* (2006.01)
*G08C 21/00* (2006.01)

(52) U.S. Cl. .................... 345/178; 178/18.03
(58) Field of Classification Search ............. 345/173, 345/178; 178/18.03
See application file for complete search history.

(56) References Cited

U.S. PATENT DOCUMENTS

| | | | |
|---|---|---|---|
| 3,705,956 A | 12/1972 | Dertouzos | |
| 3,761,877 A | 9/1973 | Fernald | |
| 3,916,099 A | 10/1975 | Hlady | |
| 4,125,743 A | 11/1978 | O'Boyle et al. | |

(Continued)

FOREIGN PATENT DOCUMENTS

JP        59-134853        9/1984

(Continued)

OTHER PUBLICATIONS

* Communication from the Japanese Patent Office dated Dec. 16, 2003, with an English language translation thereof and a brief English language summary of the documents cited therein.

(Continued)

*Primary Examiner*—Richard Hjerpe
*Assistant Examiner*—Kevin M. Nguyen
(74) *Attorney, Agent, or Firm*—Katten Muchin Rosenman LLP

(57) ABSTRACT

An interactive display system comprising a touch sensitive display surface for sensing pressure applied thereto and in response generating control signals indicating locations of the applied pressure, a personal computer for receiving the control signals and in response generating graphic images, and an LCD panel in combination with an overhead projector for receiving and projecting the graphic images onto the touch sensitive display surface at the indicated locations. The LCD panel and overhead projector may be provided an integral unit.

29 Claims, 29 Drawing Sheets

U.S. PATENT DOCUMENTS

| | | | |
|---|---|---|---|
| 4,280,135 A | 7/1981 | Schlossberg | 178/18 |
| 4,317,956 A | 3/1982 | Torok et al. | |
| 4,436,393 A | 3/1984 | Vanderwerf | |
| 4,442,317 A | 4/1984 | Jandrell | 178/18 |
| 4,442,319 A | 4/1984 | Jandrell | 178/18 |
| 4,476,463 A | 10/1984 | Ng et al. | |
| 4,516,156 A | 5/1985 | Fabris et al. | 348/14.1 |
| 4,622,437 A | 11/1986 | Bloom et al. | |
| 4,623,757 A | 11/1986 | Marino | |
| 4,672,558 A | 6/1987 | Beckes et al. | 364/518 |
| 4,684,996 A | 8/1987 | Baumeister | 348/747 |
| 4,710,758 A | 12/1987 | Mussler et al. | 340/712 |
| 4,724,480 A | 2/1988 | Hecker et al. | 348/95 |
| 4,754,334 A | 6/1988 | Kriz et al. | 358/244 |
| 4,757,239 A | 7/1988 | Starkey, IV | 348/745 |
| 4,805,205 A | 2/1989 | Faye | 348/14.08 |
| 4,846,694 A | 7/1989 | Erhardt | 345/168 |
| 4,853,498 A | 8/1989 | Meadows et al. | |
| 4,857,998 A | 8/1989 | Tsujihara et al. | 348/747 |
| 4,903,012 A | 2/1990 | Ohuchi | 340/709 |
| 4,929,935 A | 5/1990 | Rysavy et al. | 178/18.02 |
| 4,938,570 A | 7/1990 | Majima et al. | 345/173 |
| 4,953,971 A | 9/1990 | Highfill | 353/122 |
| 5,010,323 A | 4/1991 | Hoffman | 345/178 |
| 5,023,408 A | 6/1991 | Murakami et al. | 345/173 |
| 5,025,314 A | 6/1991 | Tang et al. | 178/18.11 |
| 5,091,773 A | 2/1992 | Fouche et al. | 358/10 |
| 5,115,107 A | 5/1992 | Crooks et al. | 178/18 |
| 5,115,230 A | 5/1992 | Smoot | 345/157 |
| 5,134,388 A | 7/1992 | Murakami et al. | 345/173 |
| 5,138,304 A | 8/1992 | Bronson | 340/707 |
| 5,181,015 A | 1/1993 | Marshall et al. | 345/156 |
| 5,189,732 A | 2/1993 | Kondo | 345/173 |
| 5,235,263 A | 8/1993 | Vogeley et al. | 318/701 |
| 5,235,363 A | 8/1993 | Vogeley et al. | |
| 5,239,373 A | 8/1993 | Tang et al. | 178/18 |
| 5,276,436 A | 1/1994 | Shaw et al. | 345/87 |
| 5,341,155 A | 8/1994 | Elrod et al. | |
| 5,448,263 A | 9/1995 | Martin | 345/173 |
| 5,471,226 A | 11/1995 | Suzuki et al. | 178/18.02 |
| 5,489,923 A | 2/1996 | Marshall et al. | 345/156 |
| 5,515,079 A | 5/1996 | Hauck | 345/157 |
| 5,528,263 A | 6/1996 | Platzker et al. | 345/156 |
| 5,933,132 A | 8/1999 | Marshall et al. | 345/158 |

FOREIGN PATENT DOCUMENTS

| | | |
|---|---|---|
| JP | 59-231634 | 12/1984 |
| JP | 61-026127 | 2/1986 |
| JP | 61-290523 | 12/1986 |
| JP | 62-102233 | 5/1987 |
| JP | 64-068059 | 3/1989 |
| JP | 02-003085 | 1/1990 |
| JP | 02 -003085 | 1/1990 |
| JP | 2-8925 | 1/1990 |
| JP | 2-81219 | 3/1990 |
| JP | 02-186869 | 7/1990 |
| JP | 03-15935 | 1/1991 |
| JP | 3-167621 | 7/1991 |
| JP | 6-35608 | 10/1994 |

OTHER PUBLICATIONS

"What is Windows 3.0?", Monthly ASCII, ASCII Corporation, Mar. 1, 1991, vol. 15, No. 3, pp. 229-241.

G. Nobuo Suzuki, "Birth of Handwriting Input OS, Tapping New Markers of Personal Computers, Pen Windows and PenPoint Taking Off," Nikkei Electronics, Nikkei BP Corporation, Apr. 15, 1991, No. 525, pp. 122-127.

"Artifical Reality", by Martin W. Krueger, Addison-Wesley Publishing Company, Inc., 1983, pp. vii-ix, xi-xiv, 18-40 and 55-75.

WEBSTER'S II new Riverside University Dictionary Copyright 1984 p. 83 Affine.

KTS (Kanata Teleconferencing Systems Ltd.) Electronic Writing Board System User's Manual (dated Apr. 1990).

Pickering, J. A., Touch Sensitive Screens: The Technologies and their Application, Int. J. Man-Machine Studies, pp. 249-269 (1986).

Sears, Andrew, Improving Touchscreen Keyboards: Design Issues and a Comparison with Other Devices, available from The Human-Computer InteractionLaboratory, Department of Computer Science, University of Maryland, Mar. 11, 1991.

Sutherland, I. E., Three-Dimensional Data Input by Tablet, Proceedingsof the IEEE, vol. 62, No. 4, pp. 453-461, Apr. 1974.

Uncapher, K. W., The Rand Graphic System—An Approach to a General User-Computer Graphic Communication System, A Report Prepared for Advanced Research Projects Agency (1971).

Press Release, PiezoelectricTouch Screen for the Masses, 1988 WLNR 1200767, Machine Design vol. 60,, Issue 1, Jan. 7, 1988.

Interaction Systems, Inc. Model 3002 Serial Controller and Touch Screen Operators Manual, Watertown, MA, 1985.

Interaction Systems, Inc. Model 5002 & Model 5100, Serial Controller and Touch Screen Installation and Programming Guide, Watertown, MA, 1985.

Press Release, Windows 3.0 Driver Available for Interaction Systems' Touch Screens, 1991, WLNR 2442279, Mar. 31, 1991.

Press Release, Lucas Duralith Introduces Touch Screen Development KitDesigned for Development Engineers, 1991 WLNR2431358, Feb. 22, 1991.

Press Release, Windows 3.0 Touchscreen Driver released by Elographics, Business Wire, Inc. Jul. 9, 1990.

Press Release, Monitor Mouse for OS/2: New Mouse Emulator: New Mouse Emulator for Touch Screens, Business Wire Inc. Mar. 26, 1990.

Press Release, Keyboard Shrink and Other Options Emerge to Boost Portability, Computer Design, vol. 27, No. 13, p. 67, Jul. 1988.

Press Release, Picture Clears for Industrial Touch Screens, 1988 WLNR 1206893, Machine Design, vol. 60, Issue 28, , Nov. 24, 1988.

Press Release, Touch Screen Plugs Into Serial Mouse, Infoworld, p. 25, May 1988.

Press Release, Info-Stra/Elographics: Touchscreen Breakthrough—MouseTouch Touchscreen Emulates Mouse on MAC II, IBM PC/XT/AT and 386 Computers, Business Wire Inc., May 9, 1988.

Feb. 23, 2007, Letter from George Pazuniak of Womble Carlyle Sandridge & Rice to Richard P. Bauer of Katten Muchin Rosenman, LLP regarding SMART Application No. 10/832,281.

Defendant's Second Supplemental Responses to Smart's First set of Interrogatories (NOS. 1-14) Served In Case No. 1:04-CV-713, Case No. 1:03-cv-476 consolidated with Case No. 1:04-cv-713 in U.S. District Court for the Western District of Michigan, Feb. 28, 2006.

Polyvision's response to Smart's Substituted First Set Of Interrogatories To Polyvision and Paragram (Nos. 1-14) Served In Case No. 1:04-CV-713, Case No. 1:03-cv-476 consolidated with Cse No. 1:04-cv-713 in U.S. District Court for the Western District of Michigan, Mar. 17, 2005.

Polyvision Corporation's Amended Responses To Smart's Interrogatories In Case No. 1:04-CV-713, Case No. 1:03-cv-476 consolidated with Case No. 1:04-cv-713 in U.S. District Court for the Western District of Michigan, Sep. 30, 2005.

Polyvision's Response To Smart's Second Set Of Interrogatories To Polyvision and Paragram (Nos. 14-18) In Case No. 1:04-CV-713,Case No. 1:03-cv-476 consolidated with Case No. 1:04-cv-713 in U.S. District Court for the Western District of Michigan, Sep. 15, 2005.

Polyvision's Response To Smart's Third Set Of Interrogatories To Polyvision And Paragram (No. 19) In Case No. 1:04-CV-713, Case No. 1:03-cv-476 consolidated with Case No. 1:04-cv-713 in U.S. District Court for the Western District of Michigan, Sep. 30, 2005.

Amended and Supplemented Comprehensive Chart Pursuant To 5(C) Of The Case Management Order With Regard To The Claims Asserted In Case No. 1:04-CV-713, Case No. 1:03-cv-476 consolidated with Case No. 1:04-cv-713 in U.S. District Court for the Western District of Michigan, Jul. 22, 2005.

Ployvision's Claim Construction Brief On Smart's Patents, Case No. 1:03-cv-476 consolidated with Case No. 1:04-cv-713 in U.S. District Court for the Western District of Michigan, May 19, 2005.
Plantiff Smart's Portion Of The Comprehensive Chart Pursuant To Paragraph 5(C) Of The Case Management Order, Case No. 1:03-cv-476 consolidated with Case No. 1:04-cv-713 in U.S. District Court for the Western District of Michigan, Apr. 7, 2005.
Submission By Polyvision And Paragram Of Statement Of Claim Construction Issues, Case No. 1:03-cv-476 consolidated with Case No. 1:04-cv-713 in U.S. District Court for the Western District of Michigan, Apr.7, 2005.
Polyvision's First Motion For Partial Summary Judgement - Non-Infringement And/Or Invalidity Of Claims And 14-19 Of U.S. Patent 6,747,636, Case No. 1:03-cv-476 consolidated with Case No. 1:04-cv-713 in U.S. District Court for the Western District of Michigan, Dec. 22, 2005.
Polyvision's Opening Brief In Support Of Its First Motion For Partial Summary Judgement-Non-Infringement Or Invalidity Of Claims 8 And 14-19 Of U.S. Patent 6,747,636 and Exhibits A-I, Case No. 1:03-cv-476 consolidated with Case No. 1:04-cv-713 in U.S. District Court for the Western District of Michigan, Dec. 22, 2005.
Polyvision's Position Paper and Ehhibits H, I, and J, Case No. 1:03-cv-476 consolidated with Case No. 1;04-cv-713 in U.S. District Court for the Western District of Michigan, Apr. 29, 2004.
Smart's Response To Polyvisions's Second Set Of Interrogatories (Nos. 14-23), Case No. 1:03-cv-476 consolidated with Case No. 1:4-cv-713 in U.S. District Court for the Western District of Michigan, Mar. 16, 2005.
Polyvision's Reply Brief In Support Of Its Fourth Motion For Summary Judgement - That Claims 6,10, And 20 Of The '309 Patent Are Not Anticipated , Case No. 1:3-cv-476 consolidated with Case No. 1:04-cv-713 in U.S. District Court for the Western District of Michigan, Feb. 2, 2006.
Polyvision's Reply Brief In Support Of Its Second Motion For Partial Summary Judgement-Dismissing Smart's Best Mode And Enablemnt Defenses To Claims 6, 10, And 20 Of Polyvision's U.S. Patent 5,838,309, Case No. 1:03-cv-476 consolidated with Case No. 1:04-cv-713 in U.S. District Court for the Western District of Michigan, Feb. 2, 2006.
Polyvision's Reply Brief In Support Of Its Third Motion For Partial Summary Judgement-Infringement Of United States Patent 5,838,309, Case No. 1:03-cv-476 consolidated with Case No. 1;04-cv-713 in U.S. District Court for the Western District of Michigan, Feb. 2, 2006.
Plaintiff Smart Technologies Inc.'s Statement Of Claim Construction Issues, Case No. 1:03-cv-476 consolidated with case No. 1:04-cv-713 in U.S. District Court for the Western District of Michigan, Apr. 7, 2005.
Smart's Brief On Claim Construction and Exhibits A-F, Case No. 1:03-cv-476 consolidated with Case No. 1:04-cv-713 in U.S. District Court for the Western District of Michigan, Apr. 21, 2005.
Brief In Support Of Smart's Motion for Summary Judgement That Polyvision's IBID, TS, And WT Products Infringe Smart's Martin Patents, And Request For Oral Argument and Exhibits C and D; Proof Of Service, Case No. 1:03-cv-476 consolidated with Case No. 1:4-cv-713 in U.S. District Court for the Western District of Michigan, Dec. 22, 2005.
Smart's Motion For Summary Judgement That Polyvision's IBID, TS, And WT Products Infringe Smart's Martin Patents, Case No. 1:03-cv-476 consolidated with Case No. 1:04-cv-713 in U.S. District Court for the Western District of Michigan, Dec. 22, 2005.
Smart's Brief In Opposition To Polyvision's First Motion For Partial Summary Judgement-Non-Infringement Or Invalidity Of Claims 8 And 14-19 Of U.S. Patent No. 6,747,636 and Exhibit A, Case No. 1:03-cv-476 consolidated with Case No. 1:04-cv-713 in U.S. District Court for the Western District of Michigan, Jan. 19, 2006.
Smart's Reply To Polyvision's Opposition To Smart's Motion for Summary Judgement Of Infringement Regarding The Martin Patents, Case No. 1:03-cv-476 consolidated with Case No. 1:04-cv-713 in U.S. District Court for the Western District of Michigan, Feb. 2, 2006.

Plantiff Smart's Amended Statement of Non-Liability Regarding Certain Claims Of The Martin Patents, Case No. 1:03-cv-476 consolidated with Case No. 1:04-cv-713 in U.S. District Court for the Western District of Michigan, Feb. 22, 2006.
Complaint for Case No. 3:04cv545 in U.S. District Court for the Eastern District of Virginia, Alexandria Division, Aug. 4, 2004.
Mediation Memorandum Of Smart Technologies Inc. And Smart Technologies Corporation For The Non-Binding Mediation Effort, A. Sydney Katz, Mediator, Apr. 5, 2005.
Submission By Polyvision and Paragram Of Comprehensive Chart Pursuant To Paragraph 5 (C) Of The Case Management Order, Case No. 1:03-cv-476 consolidated with Case No. 1:04-cv-713 in U.S. District Court for the Western District of Michigan, Apr. 7, 2005.
Polyvision's And Paragram's Combined Disclosure Of Invalidating Prior Art For Case No. 1:04-CV-713, Case No. 1:03-cv-476 consolidated with Case No. 1:04-cv-713 in U.S. District Court for the Western District of Michigan, Mar. 17, 2005.
Polyvision's And Paragram's Supplemental Disclosure Of Invalidating Prior Art For Case No. 1:04-CV-713, Case No. 1:03-cv-476 consolidated with Case No. 1;04-cv-713 in U.S. District Court for the Western District of Michigan, Jul. 22, 2005.
Smart's Reply To Counterclaim Set Forth In Polyvision's second Amended Answer And Counterclaim In Case No. 1:04-cv-713, Case No. 1:03-cv-476 consolidated with Case No. 1:04-cv-713 in U.S. District Court for the Western District of Michigan, Oct. 21, 2005.
Plantiff Smart's Statement Of Non-Liability Regarding Certain Claims Of The martin Patents, Case No. 1:03-cv-476 consolidated with Case No. 1:04-cv-713 in U.S. District Court for the Western District of Michigan, Feb. 22, 2006.
Brief In Support Of Smart's Motion For Summary Judgement of Non-Liability Regarding U.S. Patent No. 5,838,309 And Request For Oral Argument, Exhibits A-I, J (including J-A through J-H) and K-N and Proof of Service, Case No. 1:03-cv-476 consolidated with Case No. 1:04-cv-713 in U.S. District Court for the Western District of Michigan, Dec. 22, 2005.
Smart's Motion For Summary Judgement Of Non-Liability Regarding U.S. Patent No. 5,838,309, Case No. 1:03-cv-476 consolidated with Case No. 1:04-cv-713 in U.S. District Court for the Western District of Michigan, Dec. 22, 2005.
Elographics: MonitorMouse (tm) and MonitorMouse for Windows, Version 1.1 User's Guide, Elographics, Inc. (1989).
Elographics: MonitorMouse TM and MonitorMouse for WindowsTM 3.0, Version 1.2 User's Guide, Elographics, Inc. (1989).
Model 3100 Stand-Alone Touch Controller, User Guide, Revision C, Interaction Systems, Inc., Jan. 1987.
David E. Powell and James W. Dille, AIAA-88-4597, Modular Aircrew Simulation System, AIAA/AHS/ASEE Aircraft Design, Systems and Operations Meeting, Sep. 7-9, 1988.
Electronic Writing Board System, Kanata Teleconferencing Systems Ltd., Nov. 28, 1990.
Keith T. Burnette, Legibility Specifications for a Color Video Projection Display, Revision 1, Burnette Engineering, Apr. 28, 1987.
Keith T. Burnette, A. Determination of Minimum Luminance Requirements for the Operation of a Color Video Projection Display in the Magic Cockpit, Burnette Engineering, Apr. 22, 1987.
Letter from F.C. Baker of Lear Siegler Management Services Corp., to Michael J. Marino of Interaction Systems Inc., Jan. 31, 1989.
Kim Kitson, News from McDonnell Douglas, Mar. 18, 1992.
Cockpit Backgrounder, Apr. 9, 1985.
Big Picture Apr. 9, 1985.
Big Picture, Press Kit Captions, May 2, 1985.
News from McDonnell Douglas Corporation, May 17, 1985.
Dave Lange, News from McDonnell Douglas, Feb. 5, 1986.
Ken Reinstein, News from McDonnell Douglas, Feb. 7, 1989.
Various photos and captions, stamped with identification numbers TBCPV 0019 - TBCPV 0034; Jun., 1987.
Big Picture - answer to the big problem?, Flight International, Nov. 2, 1985.
Fusion - Man And Machine: The Cockpit Designers' Solutions for the 90s, McDonnell Douglas (1985).

"Gemini®" Electronic Conference System Installation And Service Manual, AT&T Information Systems, 1984.

"Gemini®" Electronic Conference System User's Guide, AT&T Information Systems, 1984.

How to operate the . . . gemini* Electronic Blackboard System, Bell System, 1984.

Opinion for Case No. 1:03-cv-476 consolidated with Case No. 1:04-cv-713 in U.S. District Court for the Western District of Michigan, Jun. 1, 2007.

Order for Case No. 1:03-cv-476 consolidated with Case No. 1:04-cv-713 in U.S. District Court for the Western District of Michigan, Jun. 1, 2007.

Claim Construction for Case No. 1:03-cv-476 consolidated with Case No. 1:04-cv-713 in U.S. District Court for the Western District of Michigan, Jun. 1, 2007.

Pickering, J. A., Touch Sensitive Screens: The Technologies and their Application, Int. J. Man-Machine Studies, pp. 249-269 (1986).

Sears, Andrew, Improving Touchscreen Keyboards: Design Issues and a Comparison with Other Devices, available from The Human-Computer InteractionLaboratory, Department of Computer Science, University of Maryland, Mar. 11, 1991.

Sutherland, I. E., three-Dimensional Data Input by Tablet, Proceedings the IEEE, vol. 62, No. 4, pp. 453-461, Apr. 1974.

Uncapher, K. W., The Rand Graphic System - An Approach to a General User-Computer graphic Communication System, A Report Prepared for Advanced Research Projects Agency (1971).

Press Release, PiezoelectricTouch Screen for the Masses, 1988 WLNR 1200767, Machine Design Vol. 60,, Issue 1, Jan. 7, 1988.

Interaction Systems, Inc. Model 3002 Serial Controller and Touch Screen Operators Manual, Watertown, MA, 1985.

Interaction Systems, Inc. Model 5002 & Model 5100, Serial Controller and Touch Screen Installation and Programming Guide, Watertown, MA, 1985.

Press Release, Windows 3.0 Driver Available for Interaction Systems' Touch Screens, 1991, WLNR 2442279, Mar. 31, 1991.

Press Release, Lucas Duralith Introduces Touch Screen Development KitDesigned for Development Engineers, 1991 WLNR2431358, Feb. 22, 1991.

Press Release, Windows 3.0 Touchscreen Driver released by Elographics, Business Wire, Inc., Jul. 9, 1990.

Press Release, Monitor Mouse for OS/2: New Mouse Emulator: New Mouse Emulator for Touch Screens, Business Wire Inc. Mar. 26, 1990.

Press Release, Keyboard Shrink and Other Options Emerge to Boost Portability, Computer Design, vol. 27, No. 13, p. 67, Jul. 1988.

Press Release, Picture Clears for Industrial Touch Screens, 1988 WLNR 1206893, Machine Design, vol. 60, Issue 28, , Nov. 24, 1988.

Press Release, Touch Screen Plugs Into Serial Mouse, Infoworld, p. 25, May 1988.

Press Release, Info-Stra/Elographics: Touchscreen Breakscreen Breakthrough - MouseTouch Touchscreen Emulates Mouse on MAC II, IBM PC/XT/AT and 386 Computers, Business Wire Inc., May 9, 1988.

* Communication from the Japanese Patent Office dated Dec. 16, 2003, with an English language translation thereof and a brief English language summary of the documents cited therein.

"What is Windows 3.0?", Monthly ASCII, ASCII Corporation, Mar. 1, 1991, vol. 15, No. 3, pp. 229-241.

G. Nobuo Suzuki, "Birth of Handwriting Input OS, Tapping New Markets of Personal Computers, Pen Windows and PenPoint Taking Off," Nikkei Electronics, Nikkei BP Corporation, Apr. 15, 1991, No. 525, pp. 122-127.

"Artificial Reality", by Martin W. Krueger, Addison-Wesley Publishing Company, Inc., 1983, pp. vii-ix, xi-xiv, 18-40 and 55-75.

Webster's II new Riverside University Dictionary Copyright 1984 p. 83 Affine.

KTS (Kanata Teleconferencing Systems Ltd.) Electronic Writing Board System User's Manual (dated Apr. 1990).

Board ReOrientation...

To orient the board you are given four points. Press on each one until you hear a beep.

[ OK ]  [ Go Back ]  [ ReStart ]

+

Step 4: Press here!

FIG.13d.

PROJECTION DISPLAY SYSTEM WITH PRESSURE SENSING AT SCREEN, AND COMPUTER ASSISTED ALIGNMENT IMPLEMENTED BY APPLYING PRESSURE AT DISPLAYED CALIBRATION MARKS

This application is a continuation of U.S. application. Ser. No. 09/989,154, filed Nov. 21, 2001, which is a continuation of Ser. No. 09/595,976, filed Jun. 16, 2000, now U.S. Pat. No. 6,337,681, issued Jan. 8, 2002, which is a continuation of U.S. application Ser. No. 08/477,498, filed Jun. 7, 1995, now U.S. Pat. No. 6,141,000, issued Oct. 31, 2000, which is a continuation of U.S. application Ser. No. 07/780,052, filed Oct. 21, 1991, now U.S. Pat. No. 5,448,263, issued Sep. 5, 1995.

FIELD OF THE INVENTION

This invention relates in general to display systems and more particularly to an interactive display system for projecting user drawn script in combination with screen output of application programs onto a touch sensitive display surface which is capable of providing user interaction with the applications programs.

BACKGROUND OF THE INVENTION

Various devices are known for displaying information generated by a computer as well as for inputting data into a computer. Examples of the former include CRT display screens and projection surfaces. Examples of the latter include keyboards, mouse input devices and graphic tablets.

Although such prior art devices are useful for displaying information and inputting data into a computer, it is believed that no system has hitherto been provided for integrating large scale image projection with data input in an interactive manner.

It is also well known to use a touch-sensitive screen or white board as a drawing surface for receiving and reproducing user input script. In particular, a user draws on the touch-sensitive screen using coloured markers in order to present information. Pressure sensors are provided behind the screen for detecting pressure applied to the screen as a result of drawing using the markers, and in response generating control signals which are then used to create a hard-copy print out of the image drawn on the screen.

SUMMARY OF THE INVENTION

According to the present invention, an interactive display system is provided in which a touch-sensitive screen, or white board, is used as a projection surface. Control signals are generated by the touch-sensitive screen in the usual manner responsive to user applied pressure (e.g. due to drawing on the board with a marker, pointer, stylus or finger, etc.). At the same time, a computer is used to execute any one or more well known applications programs, in the usual manner. However, according to the present invention, the computer generated screen is projected onto the touch-sensitive screen utilizing an LCD projector panel in conjunction with an overhead projector. Furthermore, according to the present invention, control signals received from the touch-sensitive screen are integrated with the computer generated graphics so as to be projected therewith onto the touch-sensitive screen. In this way, a completely interactive display system is provided in which the user can highlight and edit information generated by the computer program by simply drawing on the touch-sensitive screen. Thus, the system of the present invention provides a truly unique interactive approach to giving group presentations.

According to a further aspect of the present invention, multiple interactive computer projection systems can be interconnected (i.e. networked) and supported by a voice conferencing system such that any of several groups of users can view the output displays or input information to the system at the same time (i.e. the information is communicated to and updates all on-line computers and display devices).

Therefore, in accordance with an aspect of the present invention, there is provided an interactive display system, comprising:

a) one or more touch-sensitive display surfaces for detecting predetermined events associated therewith and in response generating control signals for identifying said events and indicating locations thereof, b) one or more computers for selectively executing one or more applications programs and in response generating screen video displays, said one or more computers being connected to respective ones of said touch-sensitive display surfaces, c) driver means in each said one or more computers for receiving said control signals from an associated one of said touch-sensitive display surfaces and in response generating a command to a selected one of said applications programs for identifying an associated one of said computers and for identifying said events and indicating the locations thereof, whereby said selected applications program executes said command and updates said screen video displays in accordance therewith, and d) projector means connected to said one or more computers for receiving and projecting said screen video displays onto said one or more touch-sensitive display surfaces.

According to a further aspect of the invention, there is provided an interactive display system, comprising:

a) a touch-sensitive display screen for sensing pressure applied thereto and in response generating control signals indicating locations of said applied pressure, and b) means for receiving said control signals and in response generating and projecting graphic images onto said touch sensitive display screen at said locations.

BRIEF DESCRIPTION OF THE DRAWINGS

A description of the preferred embodiment is provided herein below with reference to the following drawings, in which:

FIGS. 13a–13d show display screens for use during touch calibration according to the present invention;

FIGS. 23a–23d show screen displays depicting typical interactive graphics scenarios in accordance with the present invention.

DETAILED DESCRIPTIONS OF THE PREFERRED EMBODIMENTS

The principles of the invention are demonstrated in accordance with the following preferred embodiments.

Figure 1:
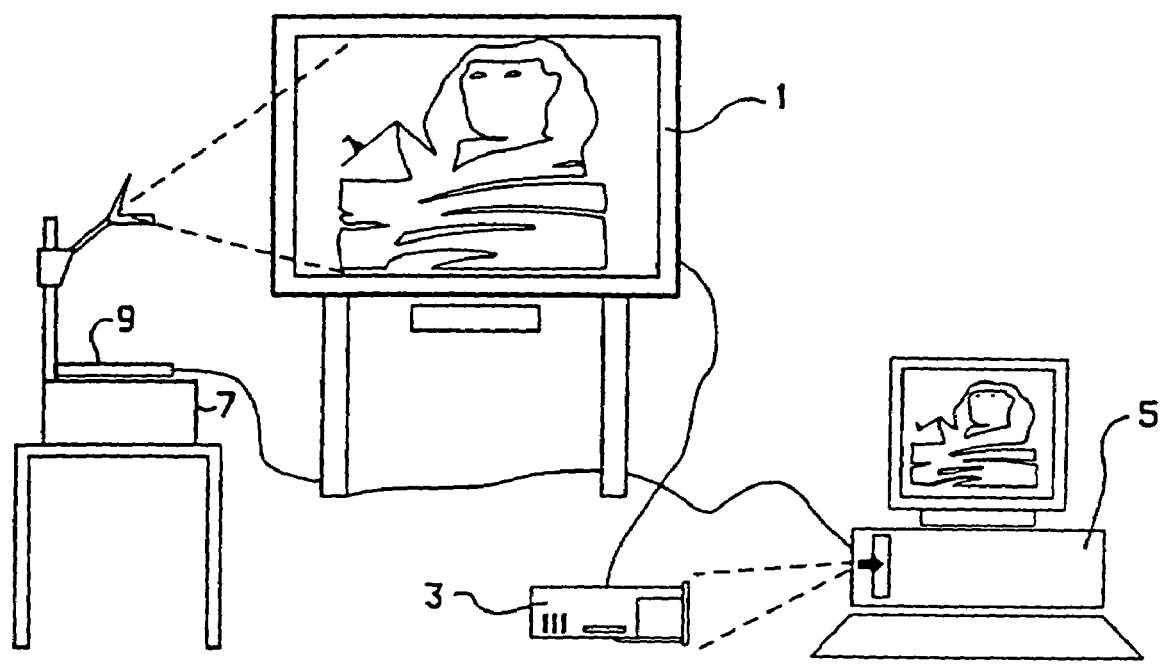
FIG. 1 is a schematic representation of the interactive display system according to the present invention.

The interactive graphics system of the present invention is shown in general with reference to FIG. 1, comprising a touch-sensitive screen 1 having an output connected to an input of an electronic touch screen controller 3 installed within a card slot of a personal computer 5.

An overhead projector 7 is orientated so as to project an image onto the surface of touch-sensitive screen 1. The image is generated by means of LCD projector panel 9 which is connected to the graphics output of the personal computer 5.

In addition to executing one or more well known applications programs (e.g. Word Processing, Spreadsheet, Graphics, etc.), according to the present invention personal computer 5 also executes a graphics translator routine for receiving coordinate or location information from the touch-sensitive screen 1 and in response interacting with the drawing queue for presenting touch-screen information to the drawing queue for the currently running application.

Thus, in operation, when a user selectively applies pressure in the form of a point, line of script, etc., to the surface of touch screen 1, information is conveyed by the touch screen 1 to computer 5 which in response updates the image projected by LCD panel 9 and projector 7 with the user script and reproduces such information at a sufficient rate that user drawings on the board 1 become interactive. Alternatively, the computer 5 can interpret the user's touch input and in response emulate operation of a mouse, light pen, digital command, etc., for conveying information to the application program being executed.

As will be discussed in greater detail below, one aspect of the present invention is the operation of a software algorithm for effecting keystone correction or adjustment of the input signal to the computer 5 to compensate for the fact that the projected image can never be an exact 90° (i.e. perpendicular) to the touch screen surface. Since any deviation from 90° will cause a distortion of the image (i.e. stretching and compression), the keystone connection algorithm is executed when orientating the touch screen 1 prior to operation in order to thereafter correct for any such distortion in the projected image.

An advantage of the interactive graphics system of the present invention is that it reduces the number of interactions necessary for a user to accomplish a task using the application running on the computer 5, and to allow the user to interface with the computer generated image by overlaying the user script onto the image.

According to an aspect of the invention, a plurality of identical interactive graphics systems may be connected in a network for conferencing purposes. A typical conferencing scenario is depicted with reference to FIG. 2, in which three systems 11, 13 and 15 (each being identical to the system depicted in FIG. 1) are located remote from one another and interconnected via a ring-type network, as will be discussed in greater detail below. Thus, input information received from the touch-sensitive screen 1 of any of the multiple interconnected systems is read by the associated computer and then communicated to the additional remote computers for display on the associated remote touch screens in conjunction with the identical application program output.

Figure 2:
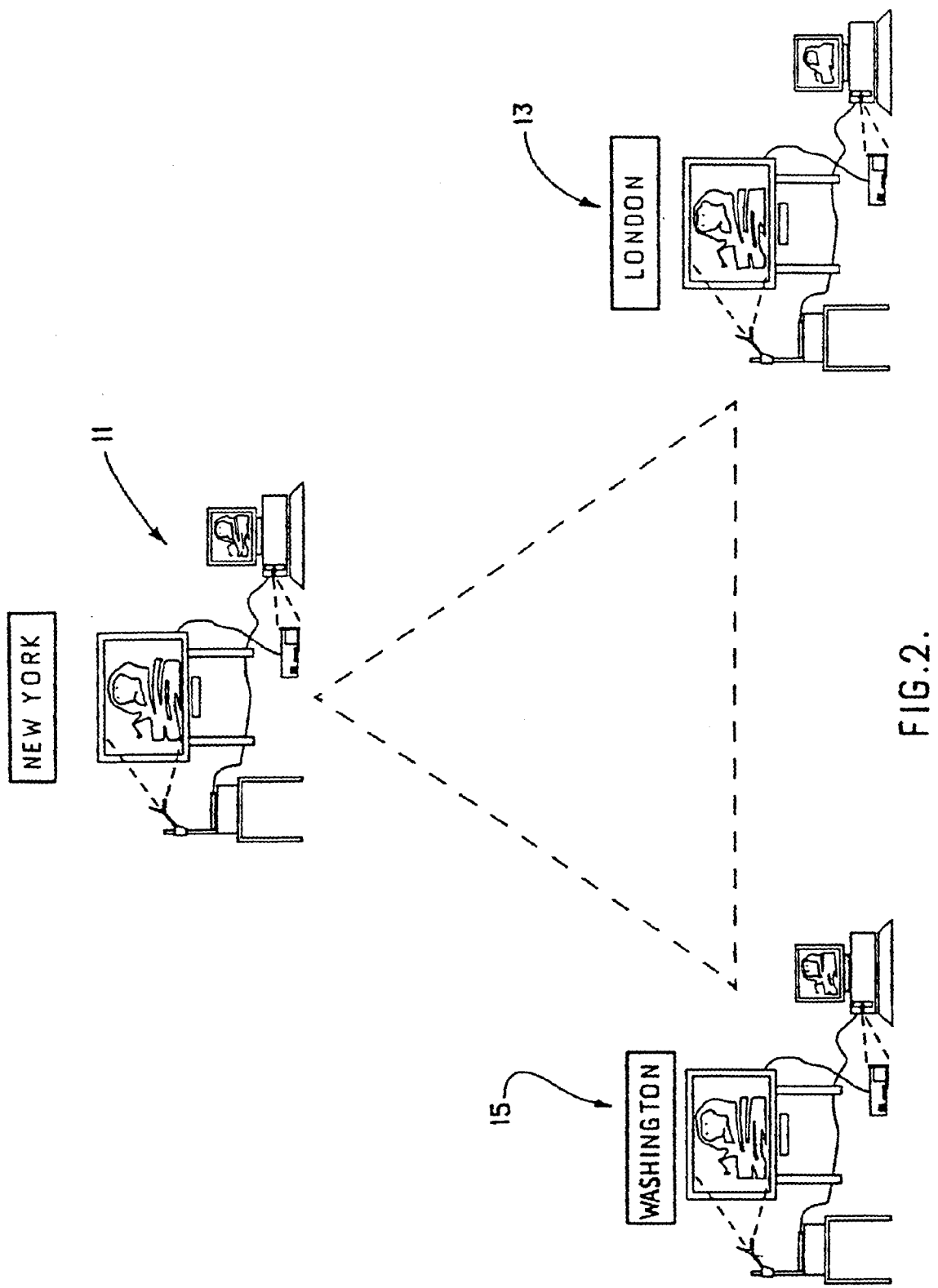
FIG. 2 is a schematic representation of the interactive display system according to the present invention for operation in conference mode.

Thus, when multiple sites 11, 13 and 15 are networked or interconnected as shown in FIG. 2, and supported by a voice conferencing system or telephone system, any of several groups of users can view the output displays or input information to the computer graphics system. This information is then communicated to and updates all on-line computers and display devices forming the system conference. The ease of data entry, ease of information display, interactivity and the elimination of a hardware input device such as a mouse, are all advantages flowing from the system according to the present invention.

In the stand-alone system of FIG. 1, several user groups can view the projected screen output, and any of these users can then update the information by pressing on the surface of touch screen 1. The computer 5, in conjunction with controller 3, recognizes the touch as either a mouse command, for updating the application, or as an overlay command, causing the image to be updated to include the user drawing (e.g. point, line or script).

In the conference environment of FIG. 2, users at a plurality of locations will view the displays simultaneously, and any user at any location can input information by touching the screen 1. The touch information is interpreted by the associated personal computer and then communicated immediately via modem or other network device to the other locations such that the displays or applications at each location are simultaneously updated.

The network implemented in accordance with the present invention is configured such that each site 11, 13 and 15 involved in the conference, has the same applications and data files running simultaneously. Update commands are sent out over the conference system for prompting every site to recompute the data and update the image projected on the local touch screens 1. Each site 11, 13 and 15 in the network or conference can communicate overlay hand graphics and erasure commands applied to the local touch screen to each other system in the conference. This allows every participant to input information immediately and to have such information displayed at each other site. Conference control can be passed to any site 11, 13 or 15 quickly and easily, as will be discussed in greater detail below. The network operating algorithm allows any graphics display, including overlaid pen graphics, to be captured and saved to disk for later reference and retrieval.

Operation of the preferred embodiments of the invention will now be described with reference to the remaining figures. Specifically, details of configuring the system for a conference and a description of the activities that a user may engage in once the system has been configured, will be described in detail.

Figure 3:
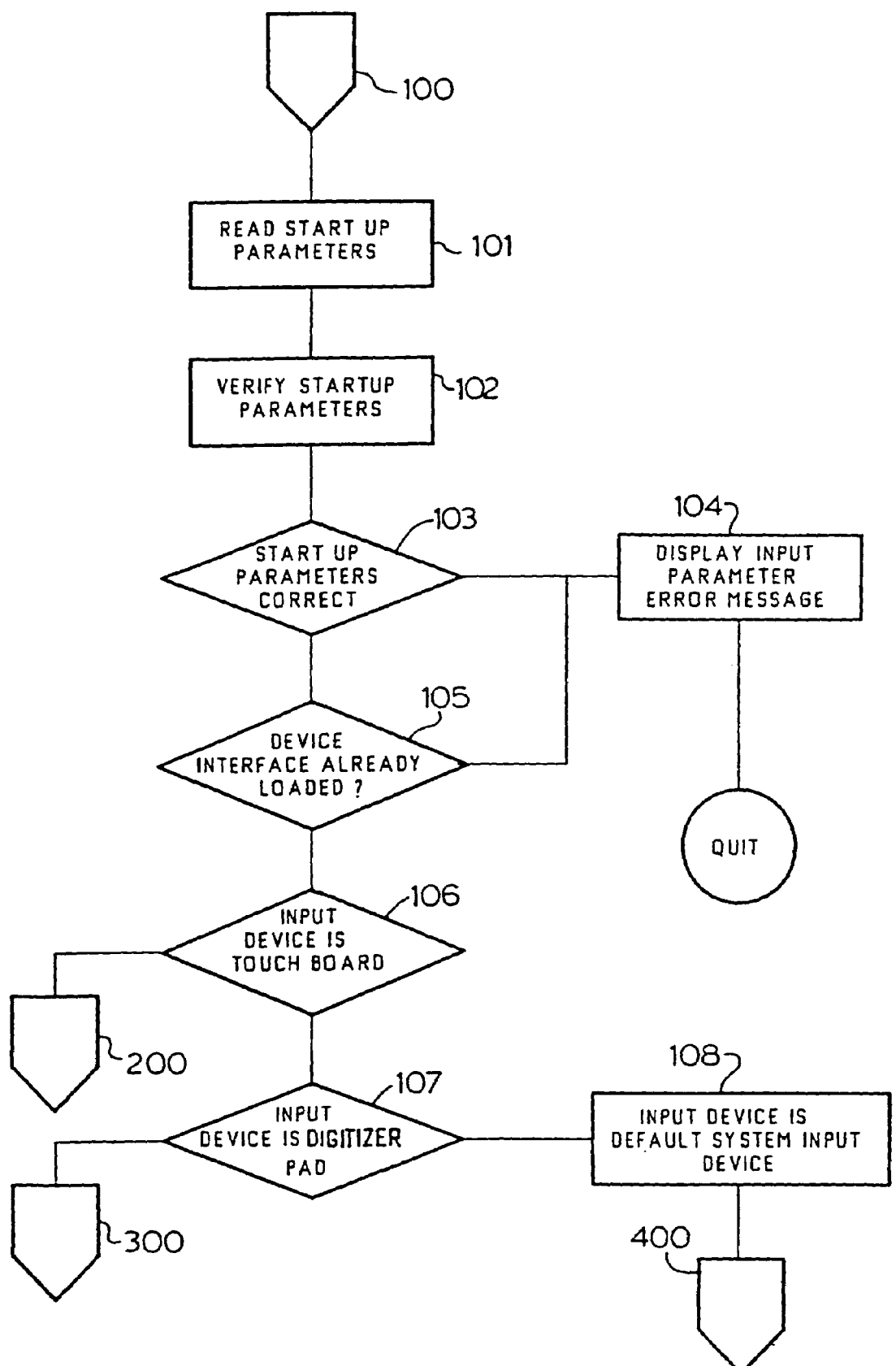
FIG. 3 is a program flow chart showing start-up procedures according to the present invention.

With reference to FIG. 3, program operation starts at step 100. After start-up of the computer 5, operational parameters for the program are read in from a default list or data file (101), depending upon the nature of the implementation. The values of the operational parameters are then verified for accuracy and validity (102). If any of the start up parameters are invalid (103) an error message reflecting the nature of the error is displayed (104) and program operation is terminated.

After completing the start-up parameter checks, a test is made to determine if the program is already loaded and operating (105). If it is, an attempt is made to restart the program, further loading instructions are aborted, an appropriate error message is displayed (104), and the program is exited.

If, on the other hand, it is determined that this is a first load operation, the type of input device connected to computer 5 is determined from the start-up parameters, and an appropriate calibration procedure is invoked. Specifically, a test is made (106) to see whether the input is a touch-sensitive screen (e.g. screen 1). If it is, the initialization routine for the touch sensitive screen 1 is entered (200).

If the input device is not a touch-sensitive screen, a test is done to determine if the input device is a digitizer board (not shown). If the device is a digitizer board, then the initialization routine for the digitizer board is selected (300). If the input is not a digitizer board then the default system input device is selected (108). The default input device may be a keyboard mouse or some other type of pointing device. Once the input device is selected, the network set up procedures are entered (400).

Figure 4:
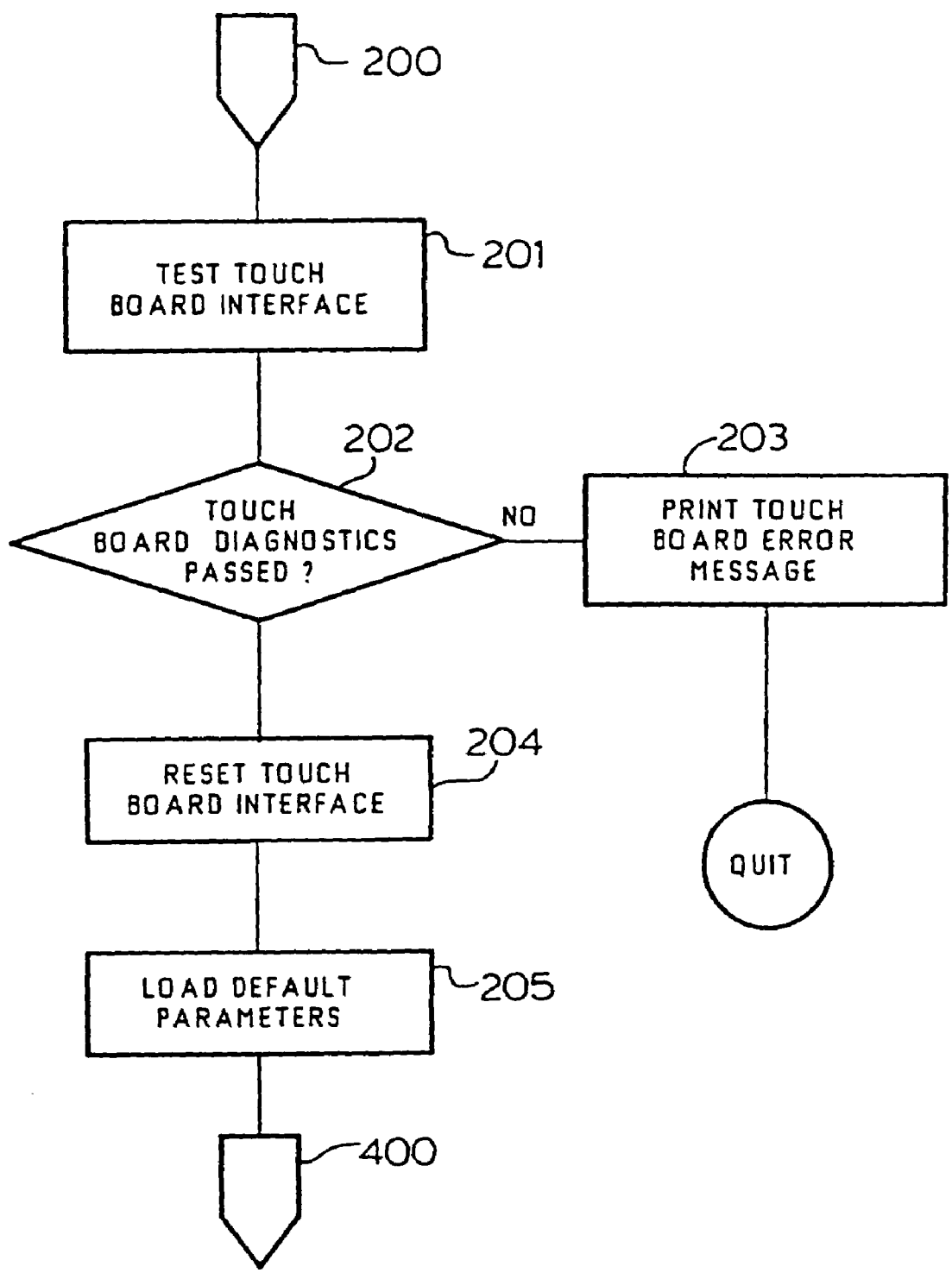
FIG. 4 is a program flow chart showing touch board initialization according to the present invention.

FIG. 4 outlines the start-up test and calibration procedure for installation utilizing a touch-sensitive screen 1. The touch sensitive screen 1 may be defined as a device that is capable of returning to a controlling device, positional information that allows the position of a point that has been touched by some device (e.g. finger, marker pen, etc.) on the surface of the screen to be determined. On entry (200), the touch screen interface device or controller 3 is tested for correct operation and installation (201). Any set-up procedures that must be completed are also done at this time. If the diagnostics are not completed successfully (202), an error message is presented (203) and the program is exited.

Upon successful completion of the test procedures, the touch screen interface 3 is reset (204) and normal default operational parameters are loaded (205). Control is then passed to the network initialization routine (400).

Figure 5:
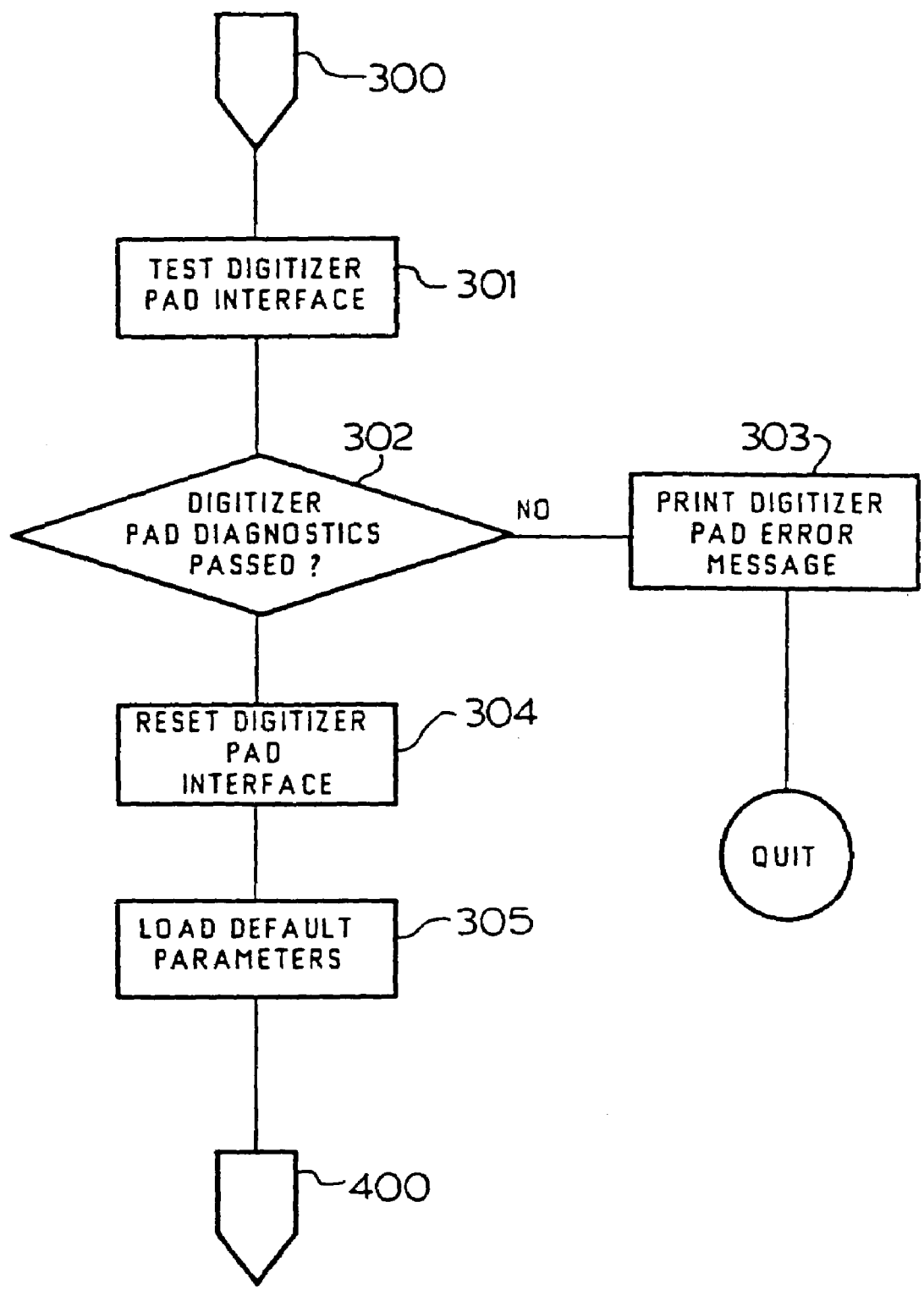
FIG. 5 is a program flow chart showing digitizer board initialization according to the present invention.

FIG. 5 outlines the start-up test and calibration procedure for installations utilizing a digitizer board. A digitizer board is defined for the purpose of the present invention, as a device that utilizes a fixed geometry structure for determining the position of a sensing device. The sensing device may be a hand-held device with function buttons or a device resembling a common pen. On entry (300), the digitizer board interface device or controller (now shown) is tested for correct operation and installation (301). Any set-up procedures that must be completed are also done at this time. If the diagnostics are not completed successfully (302), an error message is presented (303) and the program is exited. Upon successful completion of the test procedures, the digitizer board interface is reset (304) and the normal default operational parameters are loaded (305). Control is then passed to the network initialization functions (400) as discussed above with reference to FIG. 4.

If the default input device for the computer is used, positional information is determined from the device access control for the computer.

Figure 6:
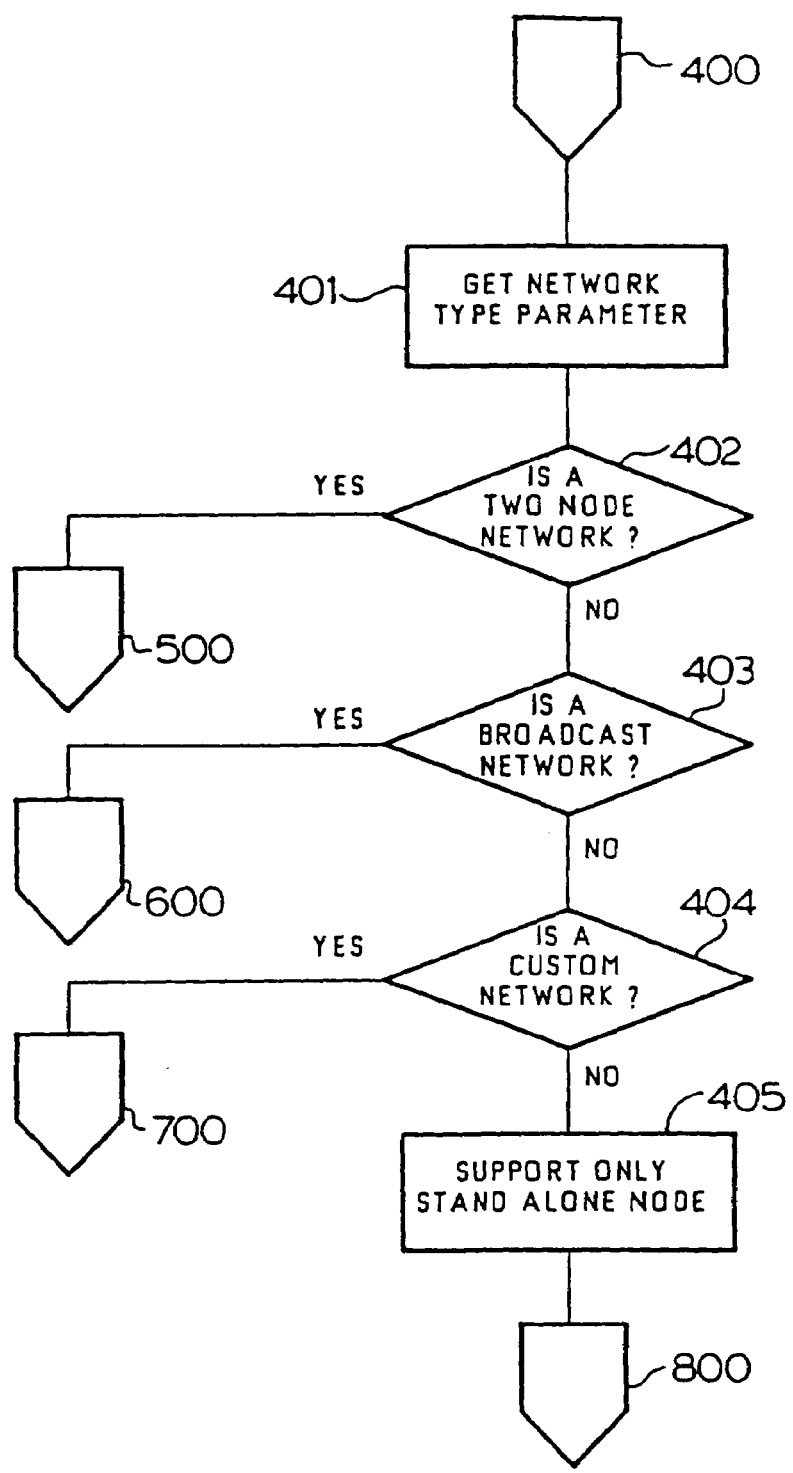
FIG. 6 is a program flow chart showing network structure determination according to the present invention.

FIG. 6 illustrates the network type determination and initialization sequence (400). First, the network type parameter is recovered (401) and processed to determine which type of network is to be set up. If a two-node network is selected (402), then the set-up procedure for the two-node network is entered (500). If the broadcast network is selected (403), then the broadcast network initialization procedure is entered (600). If a custom network is selected (404) then the custom network set up procedure is entered (700). If no network is selected, then the stand-alone mode is selected by default.

The various types of network that are supported in the system of the present invention are as follows: two-node network, broadcast network, and "mother" network structures. For the purpose of describing the present invention, a network is used to link two or more conferencing systems together. Information sent over the network allows all of the remote machines to stay synchronized with the current master machine. Running functionally identical programs at each of the remote sites requires the network to handle only control commands and not the large amount of continuous data that is normally generated by remote television conferencing. Reducing the linking network requirements to control passing improves the versatility of remote conferencing while substantially improving performance over such prior art television conferencing systems.

A two-node network is defined for the purpose of the present invention, as a network where two conference systems are linked together and are capable of simultaneous communication.

Broadcast networks are characterized by one system sending out information while all of the other conference systems operate in receive mode. This network has the attribute of allowing a number of systems to be involved in a presentation-type conference without incurring performance degradation.

Custom networks cover any of a variety of networking structures that either are now, or will be, provided to facilitate the simultaneous communication of multiple conferencing systems.

If no network type is specified, then the conference system is set up to operate in stand-alone mode. This mode of operation is supported to allow for presentation preparation and user training on a single system, such as shown with reference to FIG. 1.

Figure 7:
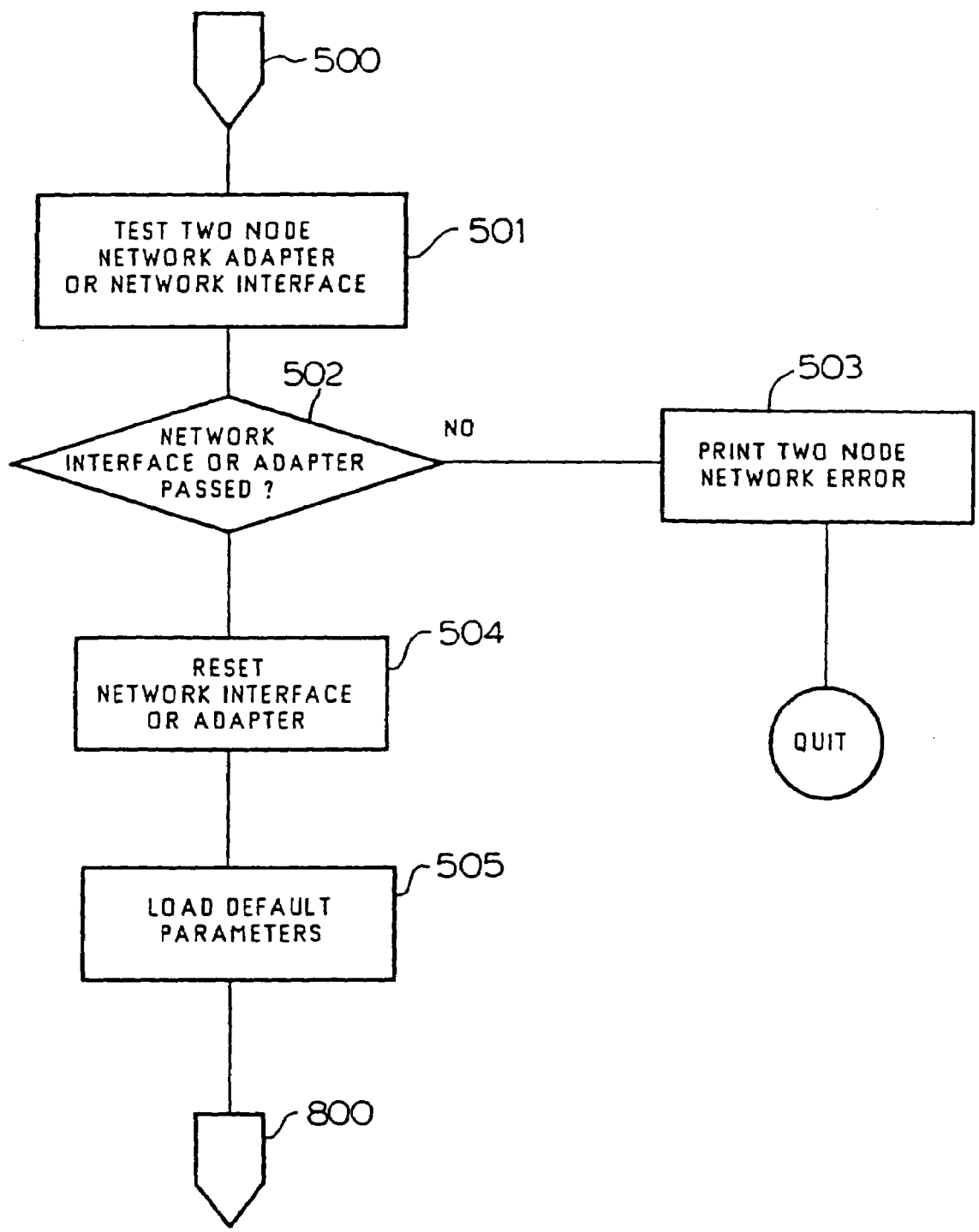
FIG. 7 is a program flow chart showing two node network initialization according to the present invention.

FIG. 7 shows the program steps for installation and testing of the two-node network structure. On entry (500) the network adaptor or controller (incorporated into computer 5) is tested for correct installation and operation (501). In the event of an error during this test (502), an error message is printed (503) and the program is exited. A network controller or adaptor error generally will indicate a hardware failure.

If the two-node network adaptor or controller passes the initialization tests (502), the adaptor is reset (504). Following the reset operation, the default two-node network parameters are loaded (505) and control is passed to the main program start-up procedure (800).

Figure 8:
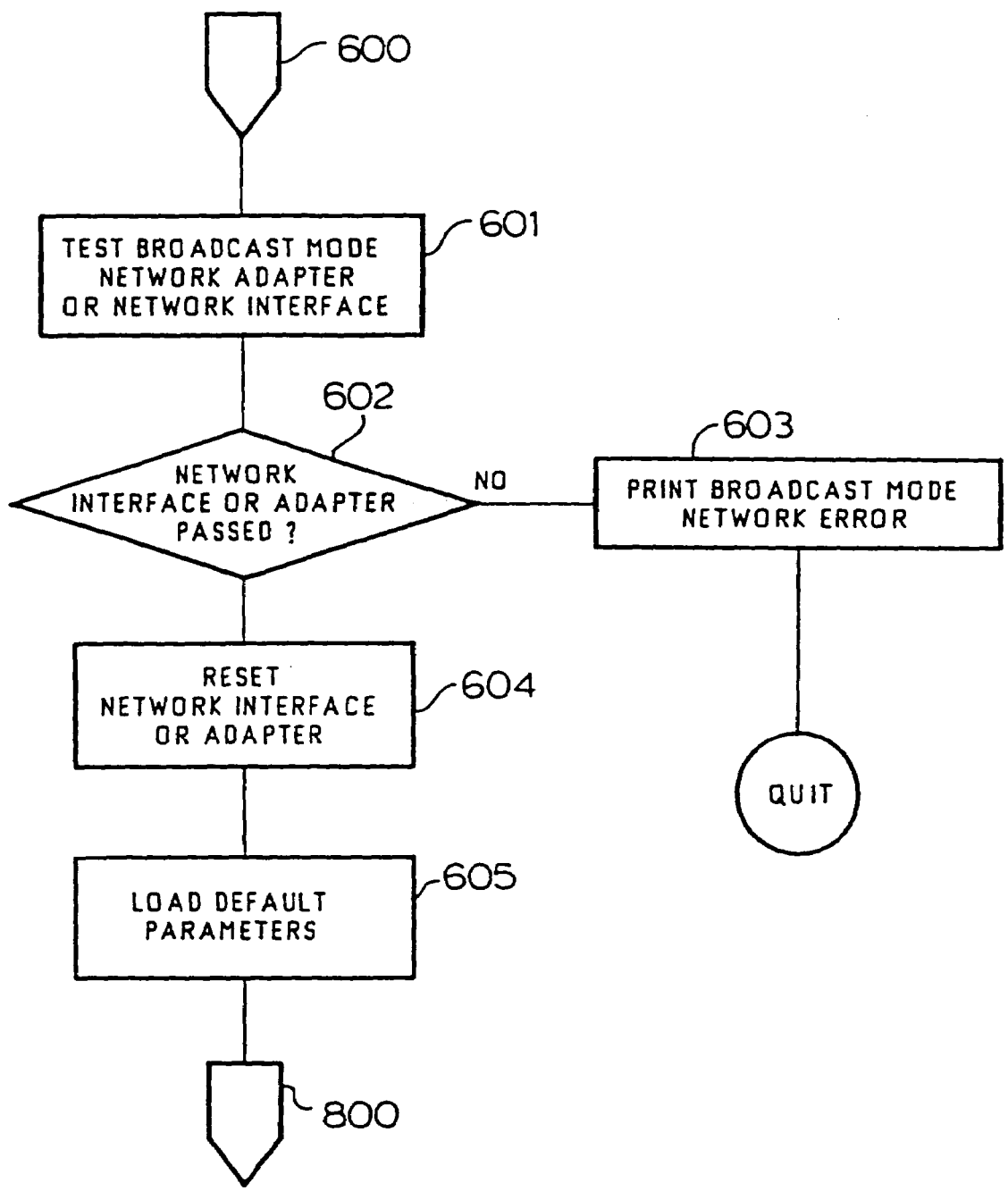
FIG. 8 is a program flow chart showing broadcast network start up according to the present invention.

FIG. 8 shows the installation and testing steps of the broadcast network structure. On entry (600), the network adaptor or controller is tested for correct installation and operation (601). In the event of an error carrying out this test (602), an error message is printed (603) and the program is exited. A network controller or adaptor error generally will indicate a hardware failure. If the broadcast network adaptor or controller passes the initialization tests (602), the adaptor is reset (604). Following the reset operation, the default broadcast network parameters are loaded (605) and control is passed to the main program start-up procedure (800).

Figure 9:
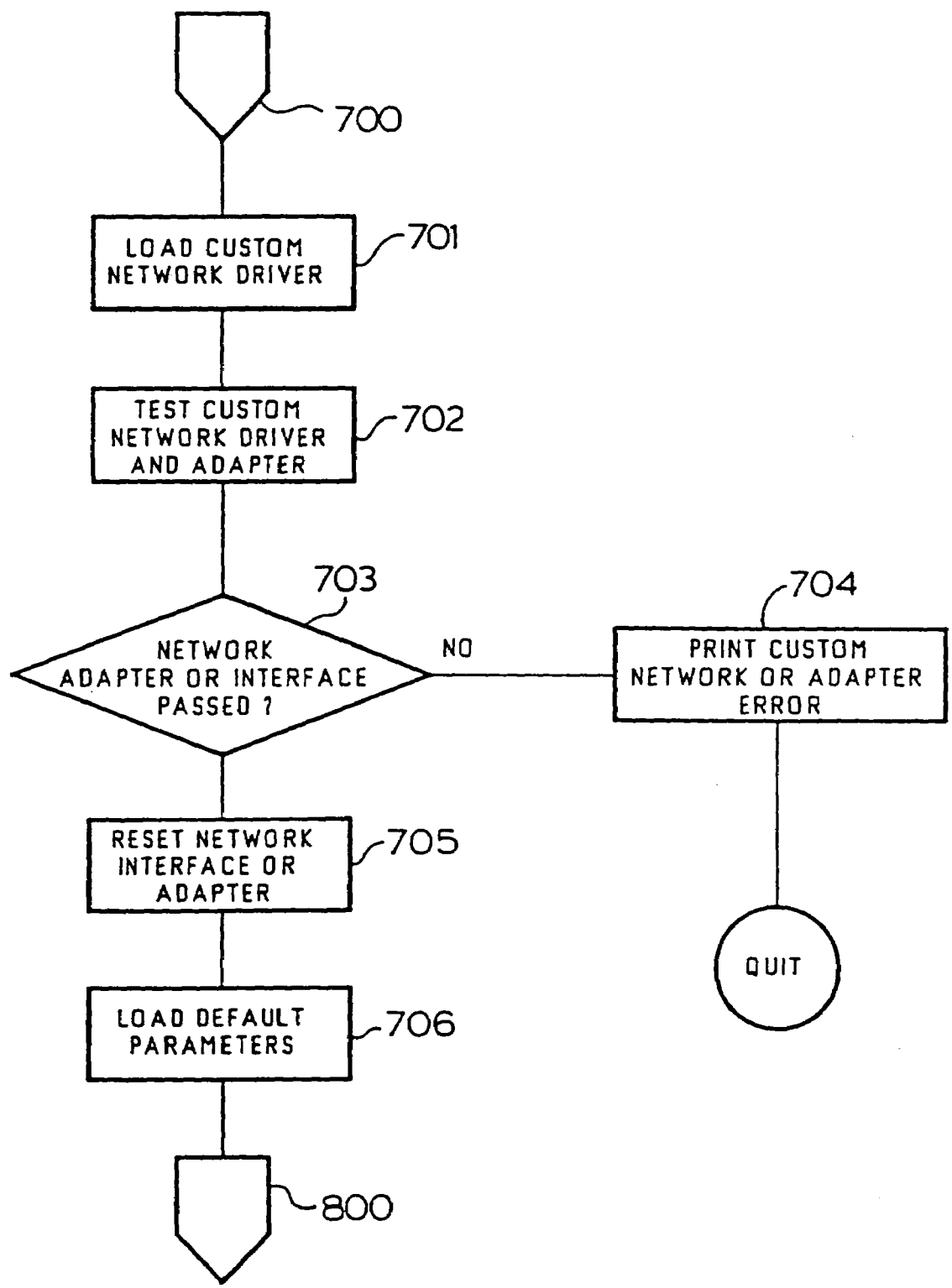
FIG. 9 is a program flow chart showing custom network start up according to the present invention.

FIG. 9 shows the installation and testing steps of a custom network structure. On entry (700), the software driver for the custom network adaptor or controller (located in computer 5) is loaded (701). The network adaptor or controller is then tested for correct installation and operation (702). In the event of an error during this test (703), an error message is printed (704) and the program is exited. A network controller or adaptor error generally will indicate a hardware failure. If the custom network adaptor or controller passes the initialization tests (703) the adaptor is reset (705). Following the reset operation the default custom network parameters are loaded (706) and control is passed to the main program start-up procedure (800).

Figure 10:
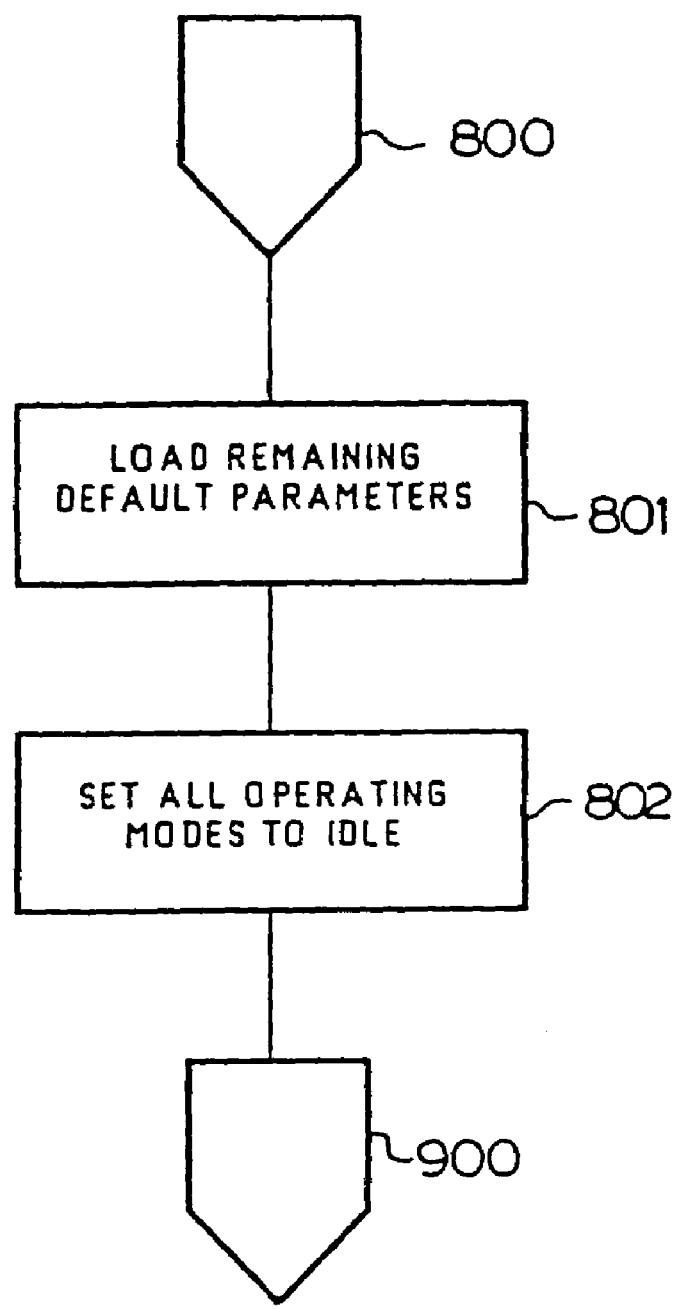
FIG. 10 is a program flow chart showing final initialization procedures according to the present invention.

FIG. 10 shows the final phase of low level initialization prior to entering the main control portion of the program. On entry (800), any remaining default operating parameters are loaded (801). These parameters include options such as display screen parameters, file parameter specifications, etc. All internal operating modes are then set to idle (802) and control is passed to the main control program sections (900).

Figure 11:
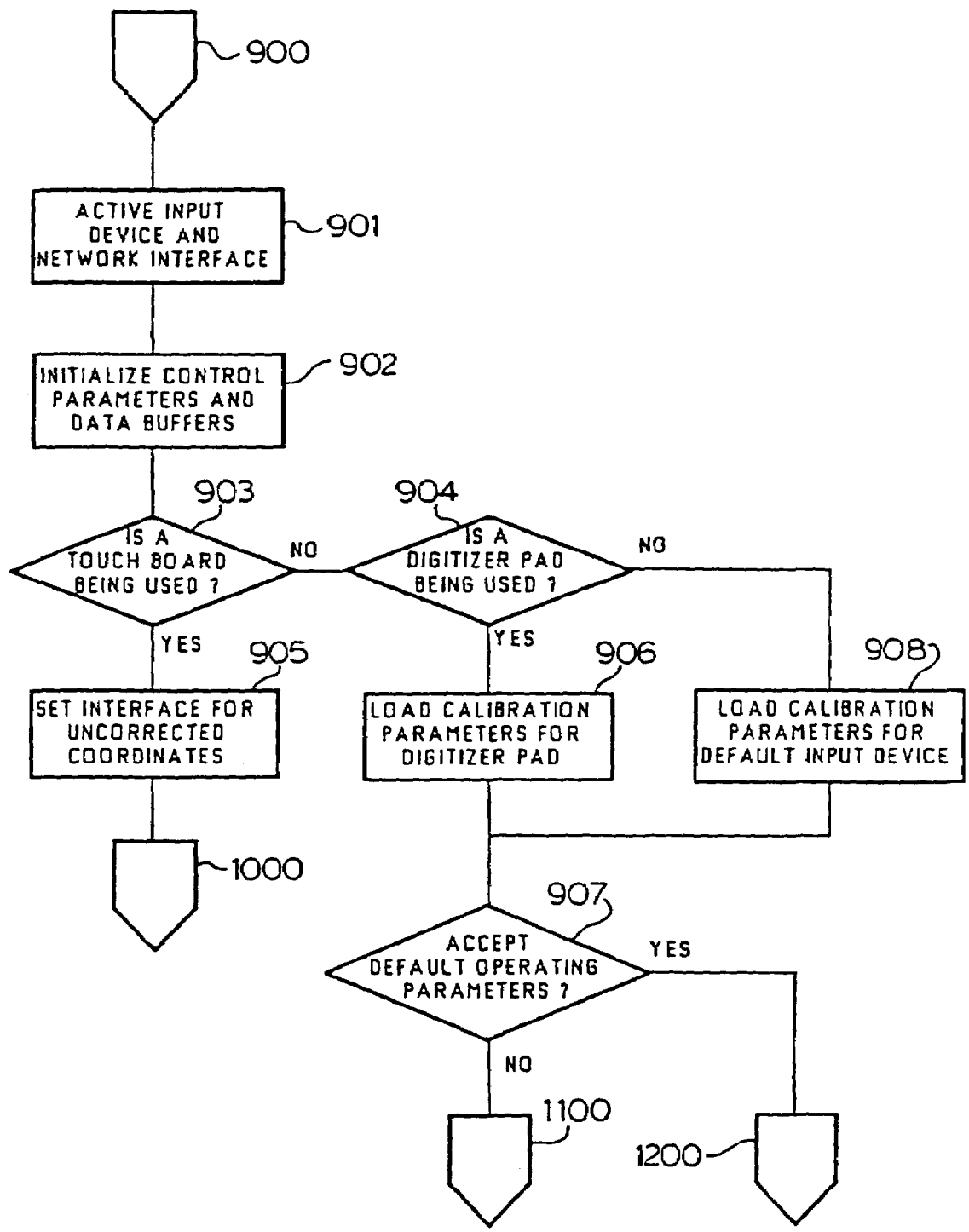
FIG. 11 is a program flow chart showing the main program start up routine according to the present invention.

FIG. 11 shows the main program start-up code structure. On entry (900), the input device and the selected network interface are activated (901). In addition, the main control program start-up parameters are also initialized. Following the parameter set-up, a series of tests are done to determine the type of input device set-up and orientation that will be required. If a touch-sensitive screen 1 has been specified, then the interface is set-up to return uncorrected coordinates (905). The touch-sensitive screen alignment procedure is then invoked (1000). If a touch-sensitive screen was not selected (903), a test is then made to determine whether a digitizer board is being used (904). If a digitizer board has been selected, then the absolute scale and alignment parameters for the board are loaded from an external source (906).

The program flow then proceeds on to determine if the default mean control program operating parameters will be accepted (907). If not, the operating parameter input procedures are invoked (1100).

If the default parameters are accepted, control is passed to the applications set-up procedures (1200).

If a digitizer board was not selected (904), then the calibration parameters for the default computer input device are loaded from an external source (908). The program flow then proceeds on to determine if the default main control program operating parameters will be accepted (907). If not, the operating parameter input procedures are invoked (1100). If the default parameters are accepted, control is passed to the applications set-up procedures (1200).

Figure 12:
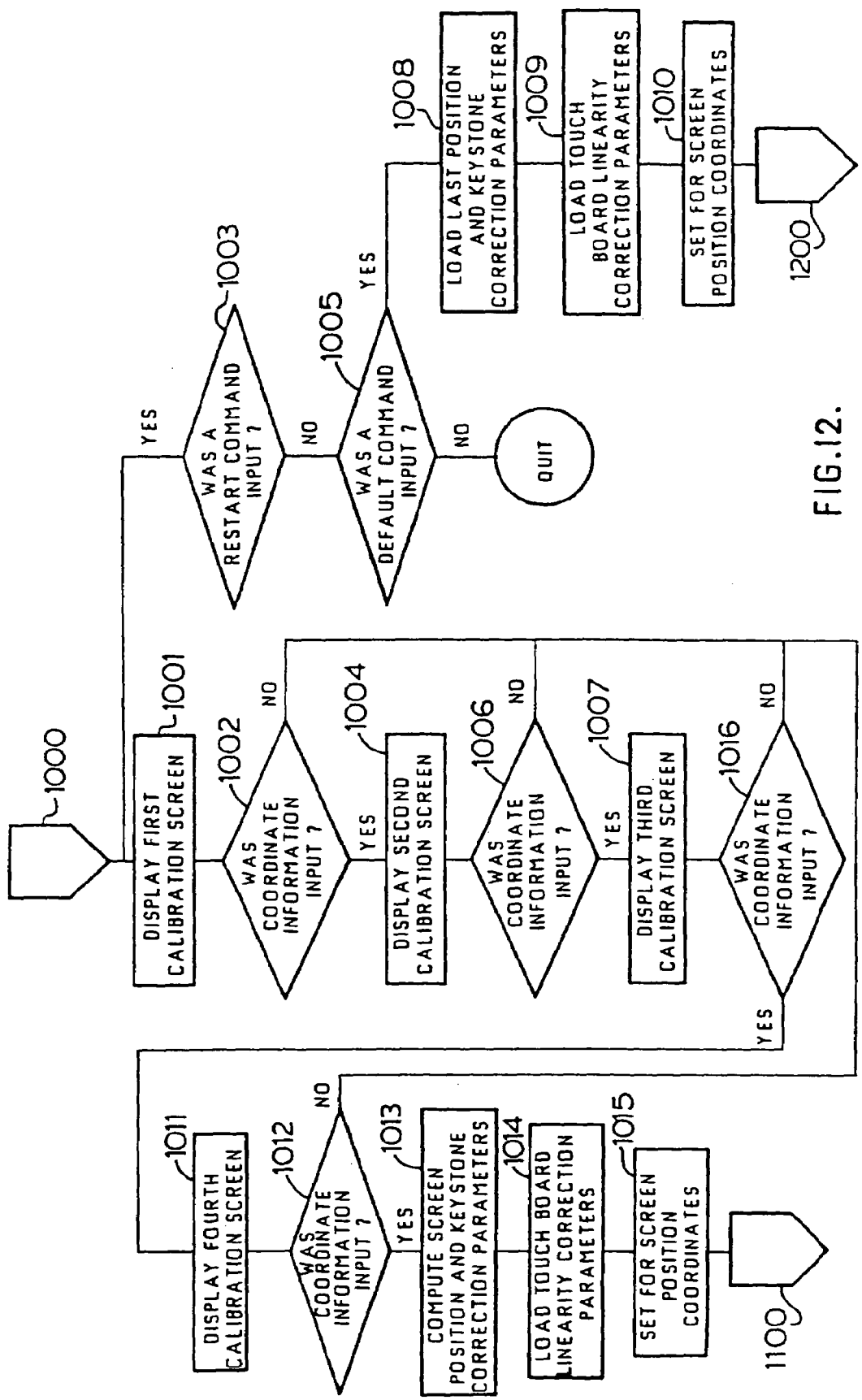
FIG. 12 is a program flow chart showing touch board calibration according to the present invention.

FIG. 12 represents the touch board alignment procedure which ensures that the image on the touch-sensitive screen 1 corresponds with the image appearing on the display of computer 5. The purpose of this alignment procedure is to determine the position of the projected image on the touch-sensitive screen and to determine the corrections required to compensate for image projection problems. Keystoning caused by a misalignment between the projector 7 and the touch-sensitive screen 1 (FIG. 1) is the primary problem that is addressed by this procedure. Other problems such as rotation of the image on the touch-sensitive screen and related issues are also overcome by this calibration procedure.

On entry (1000), a first alignment image is presented (1001). The alignment image is made up of a marker, dot or cross, and preferably also text explaining to the user what to do, as shown in the screen display of FIG. 13*a*. The marker is projected at a known point on the touch-sensitive screen 1. The information returned by the screen 1 when the marker is touched, is used to indicate the marker's position on the touch-sensitive screen surface 1.

Figure 13A:
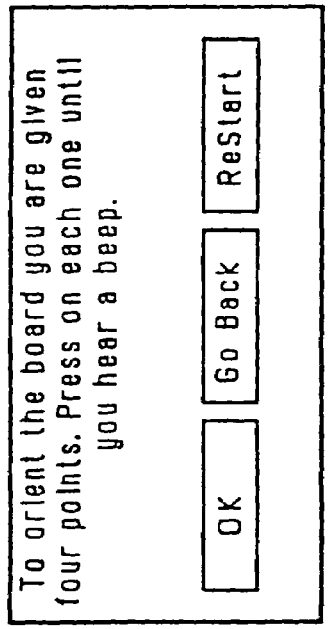

As shown in FIG. 13*a*, in addition to the marker related text, the user has the option to select the last coordinate points which had been previously input (e.g. "Go Back"). These points are saved from the previous use of the program. Alternatively, the user may restart the calibration procedure (e.g. by depressing "ReStart" on the screen 1).

The program then waits and checks for user input (1002). If coordinate information is not received from the user (1002), a test is made for a restart request (1003). If the user's input was a restart request, the calibration sequence is restarted (1001). If the user's request was not a restart request (1003), a test is made to determine if the user wants to use the default parameters (1005). If not, the program is exited. If the user accepts the default parameters (1005), the last set of position and correction parameters are loaded (1008, 1009). The touch-sensitive screen interface 3 is then set for returning corrected coordinates to the program (1010). Control is then passed to the default applications list procedure (1200).

Figure 13B:
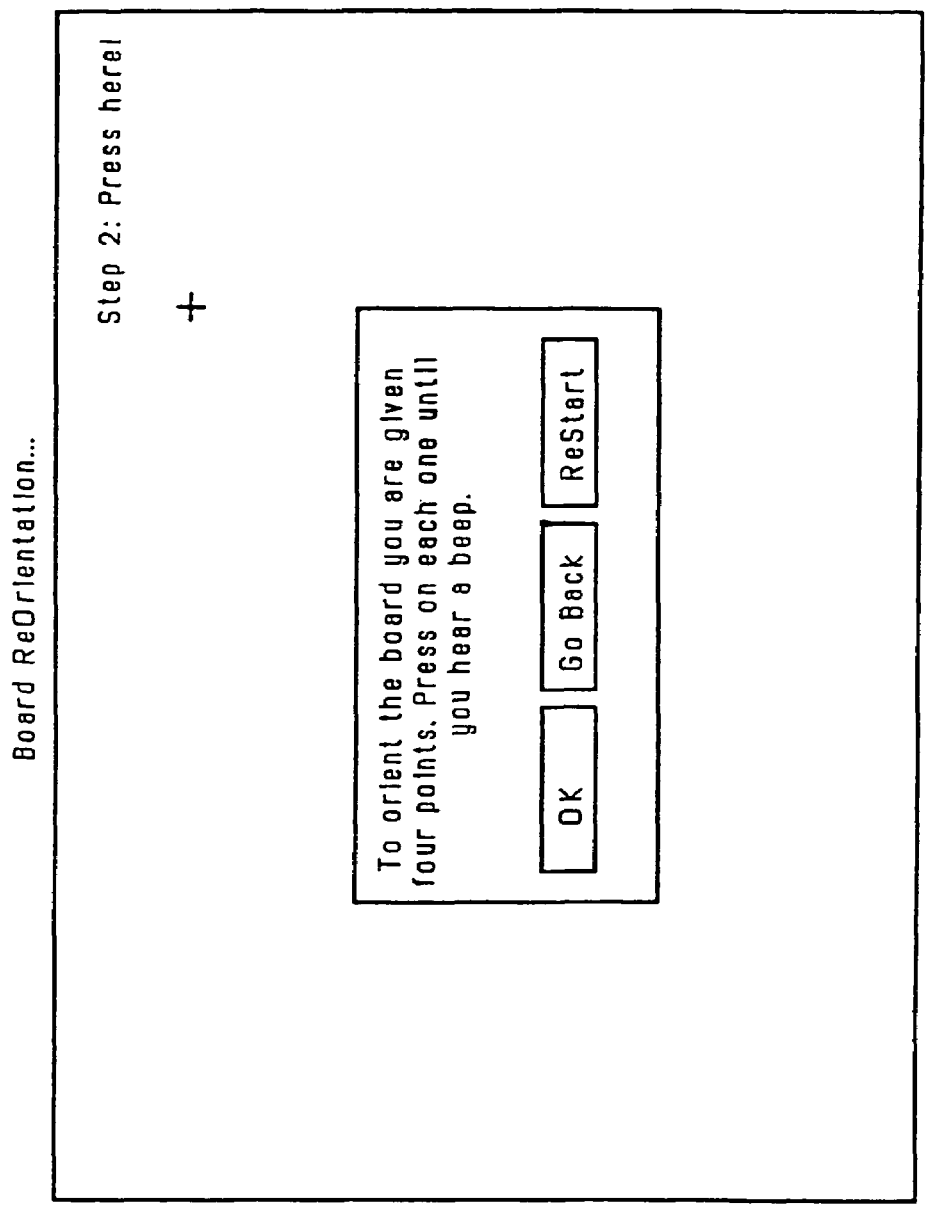

If the user's input was coordinate information (1002), the coordinate is saved and a second calibration screen is presented (1004), as shown with reference to FIG. 13*b*.

The system then waits and checks for user input (1006). If coordinate information is not received from the user (1006) a test is made for a restart request (1003). If the user's input was a restart request, the calibration sequence is restarted (1001). If the user's request was not a restart request (1003), a test is made to determine if the user wants to use the default parameters (1005). If not, the program is exited.

If the user accepts the default parameters (1005), the last set of position and correction parameters are loaded (1008, 1009). The touch-sensitive screen interface 3 is then set for returning corrected coordinates to the program (1010). Control is then passed to the default applications list procedure (1200).

Figure 13C:
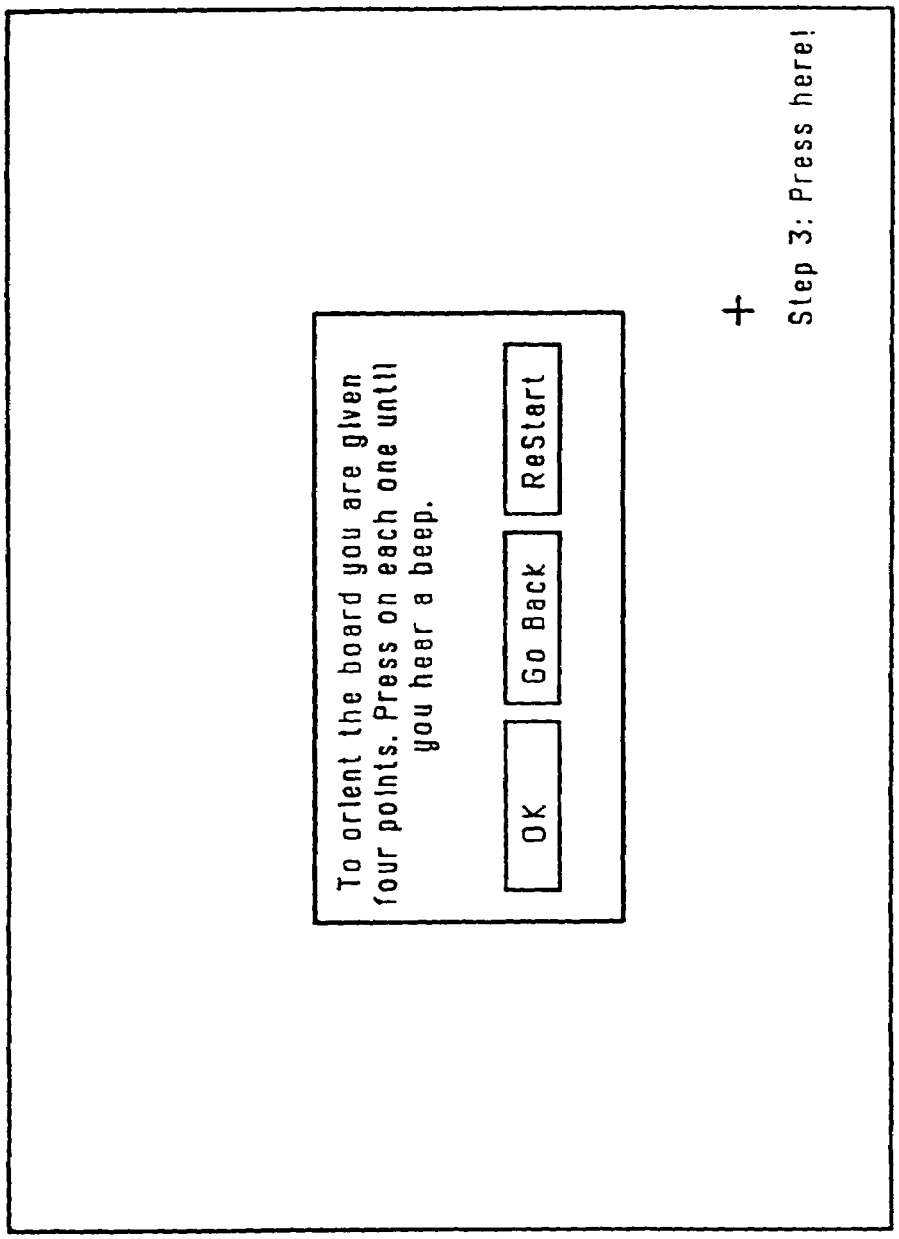

If the user's input was coordinate information (1006), then the coordinate is saved and the third calibration screen (FIG. 13*c*) is presented (1007).

The system then waits and checks for user input (1016). If coordinate information is not received from the user (1016), a test is made for a restart request (1003). If the user's input was a restart request, the calibration sequence is re-started (1001). If the user's input was not a restart request (1003), a test is made to determine if the user wants to use the default parameters (1005). If not, the program is exited.

If the user accepts the default parameters (1005), then the last set of position and correction parameters are loaded (1008, 1009). The touch sensitive screen interface 3 is then set for returning corrected coordinates to the program (1010). Control is then passed to the default application list procedure (1200).

If the user's input was coordinate information (1016), then the coordinate is saved and the fourth calibration screen (FIG. 13*d*) is presented (1011). A wait and check is performed for user input (1012). If coordinate information is not received from the user (1012), a test is made for a restart request (1003). If the user's input is a restart request, then the calibration sequence is restarted (1001). If the user's request is not a restart request (1003), a test is made to determine if the user wants to use the default parameters (1005). If not, the program is exited.

If the user accepts the default parameters (1005), then the last set of position and correction parameters are loaded (1008, 1009). The touch-sensitive screen interface 3 is then set for returning corrected coordinates to the program (1010). Control is then passed to the default applications list procedure (1200).

If the user's input is coordinate information (1012), then the screen position and correction parameters are computed (1013) and saved for future use.

Previously computed touch-sensitive screen linearity parameters are then loaded (1014) and the interface 3 is set to return corrected coordinates. Control is subsequently passed to the applications loading procedure (1100).

Figure 14:
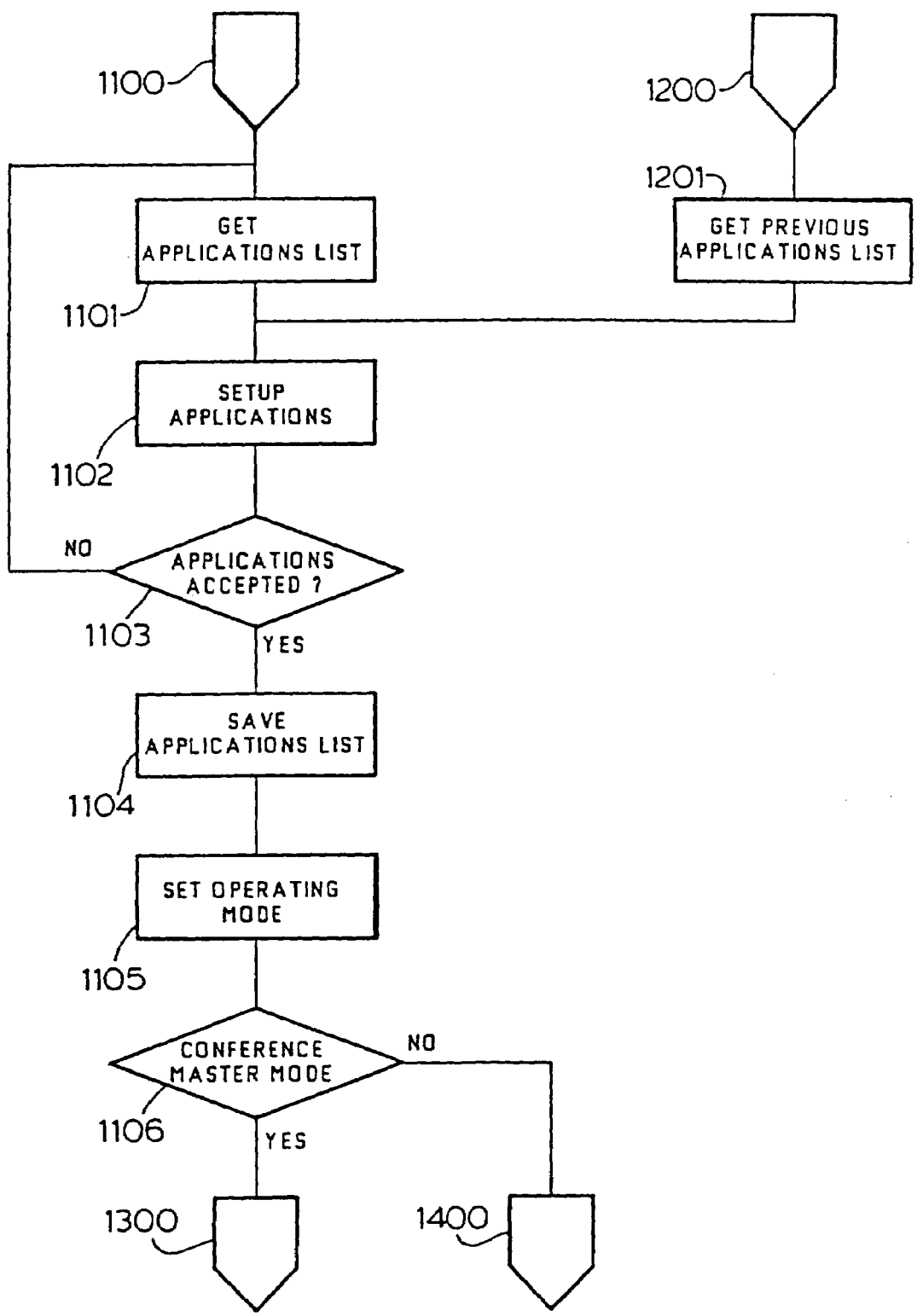
FIG. 14 is a program flow chart showing the applications set up routine according to the present invention.

FIG. 14 shows the applications loading and set-up operations according to the present invention. One aspect of the present invention is that standard applications software running at multiple remote sites can be controlled simultaneously from a single site. To accomplish this, information regarding the type and structure of the application software to be run, is loaded into the program according to the present invention. The procedure outlined in FIG. 14 handles the application information operation. There are two entry points to this procedure (1100 and 1200).

The first entry point (1100) is used where the user has not selected a default settings option. In this case, the user is asked for the list of applications to be used (1101).

Figure 15A:
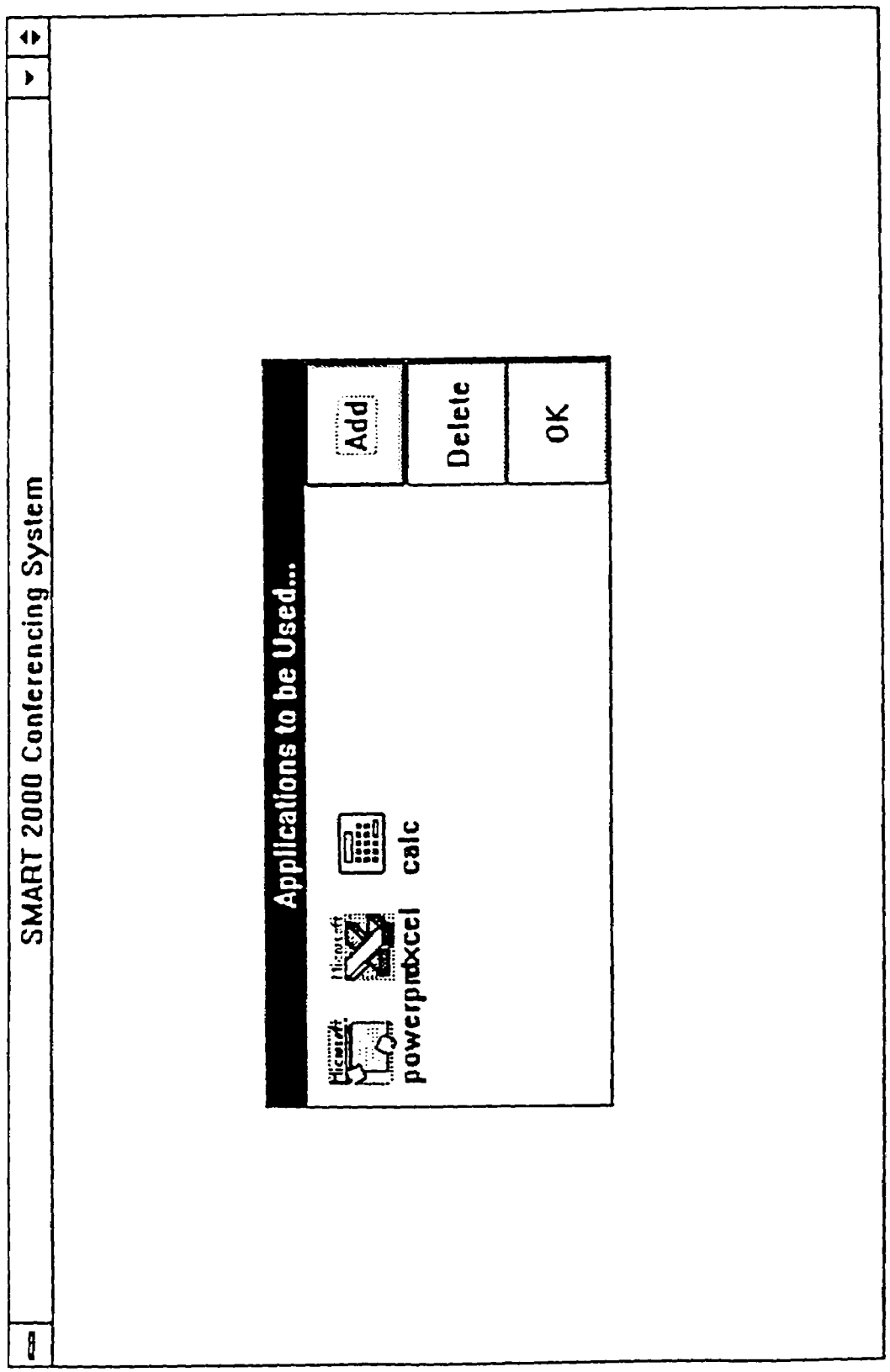
FIGS. 15a–15d show display screens for use during applications set up according to the present invention.
Figure 15B:
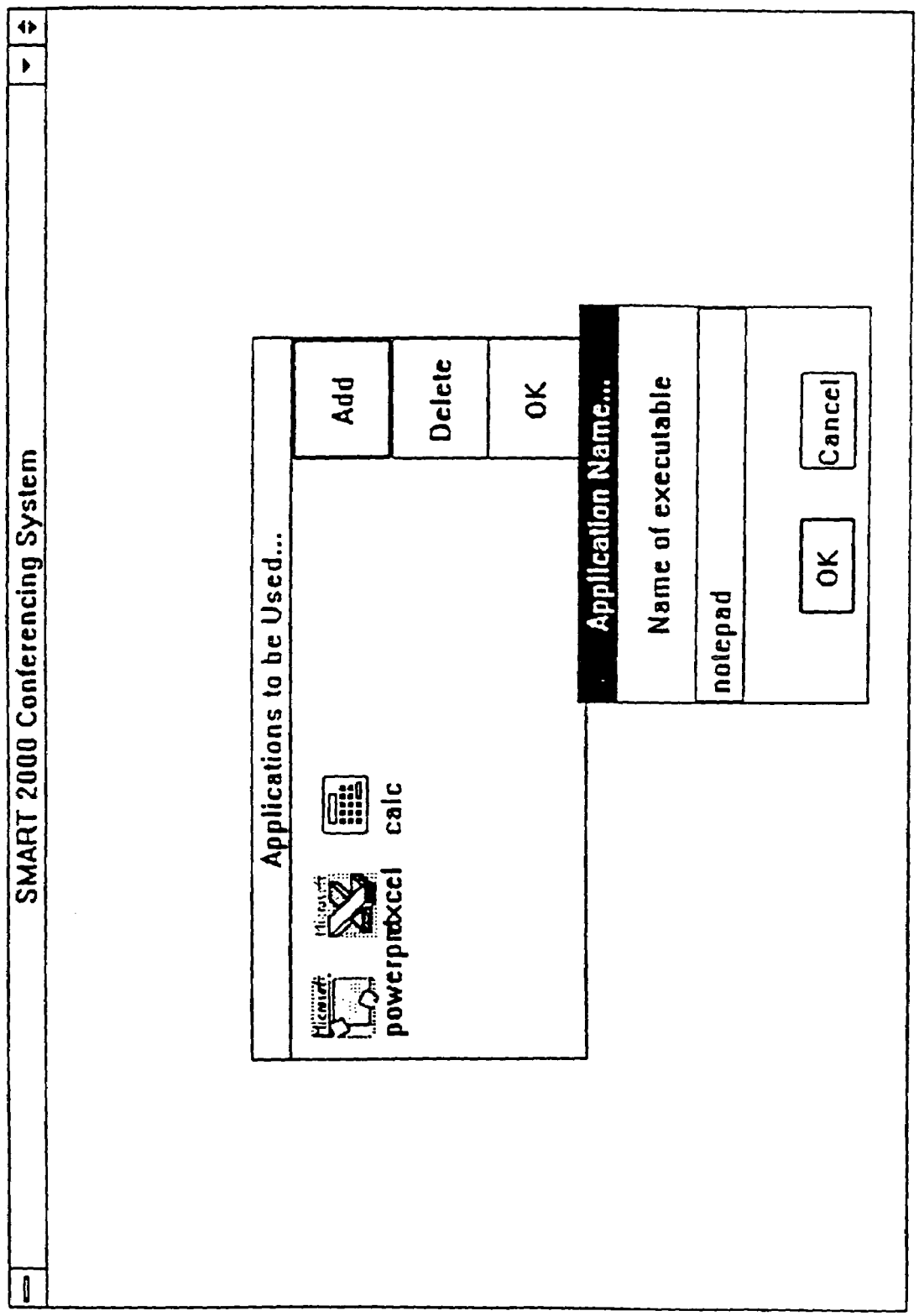
Figure 15C:
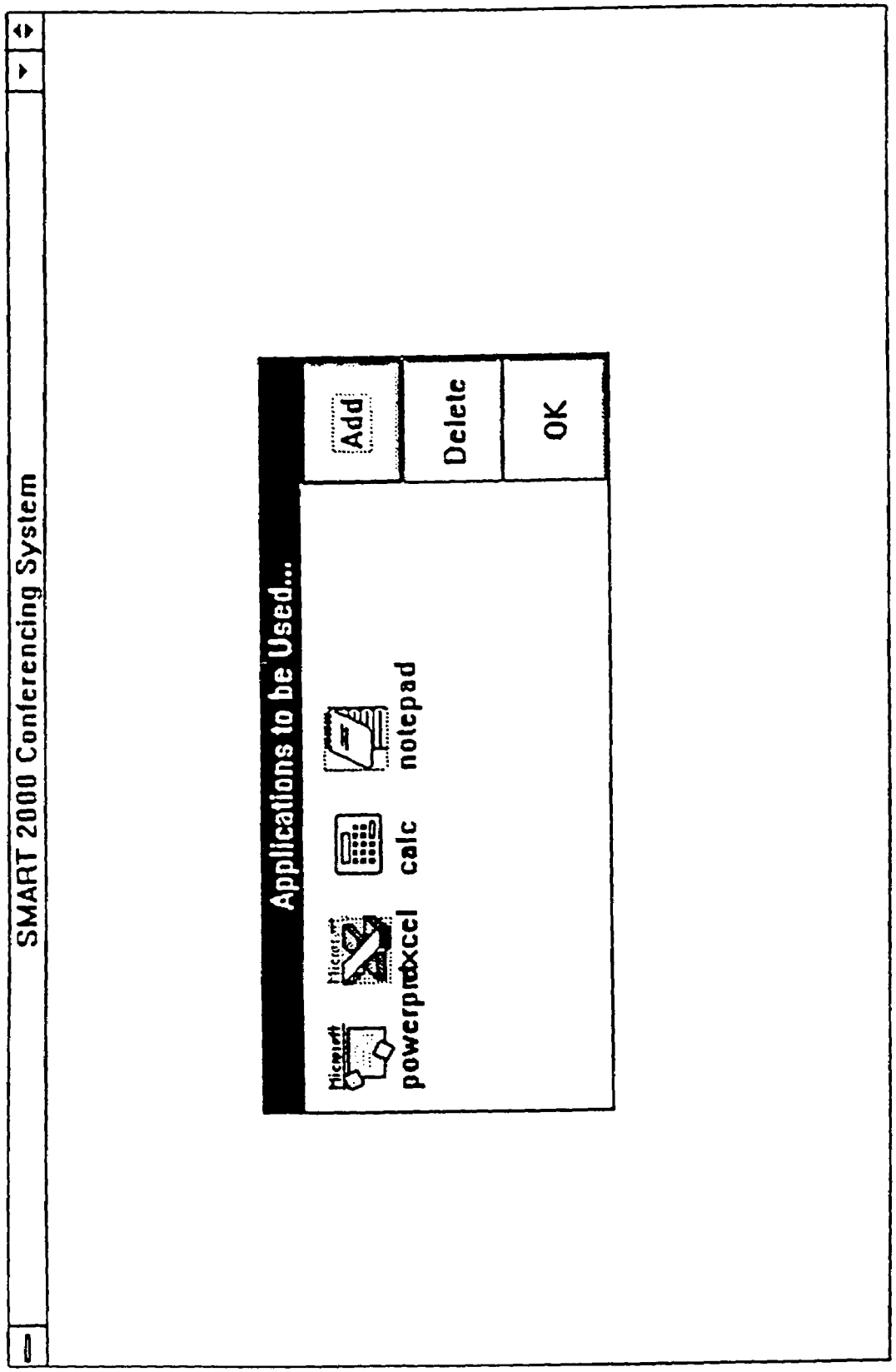

For example, with reference to the screen display of FIG. 15*a*, the applications Powerpnt, Excel and Calc are shown. The user may add a further application, such as Notepad, by depressing the touch-sensitive screen 1 where the prompt "Add" appears (FIG. 15*a*). The program then prompts the user to input via the keyboard of computer 5 (or via screen 1), the name of the application, as shown in FIG. 15*b*. The user may then accept the application, resulting in an icon appearing therefor (see FIG. 15*c*). When the user has completed the entry of the applications lists, control is passed to the applications set-up operation (1102).

If the default settings entry point (1200) is used, the previously used applications lists is loaded (1201) and control is passed to the applications set-up operation (1102).

Figure 15D:
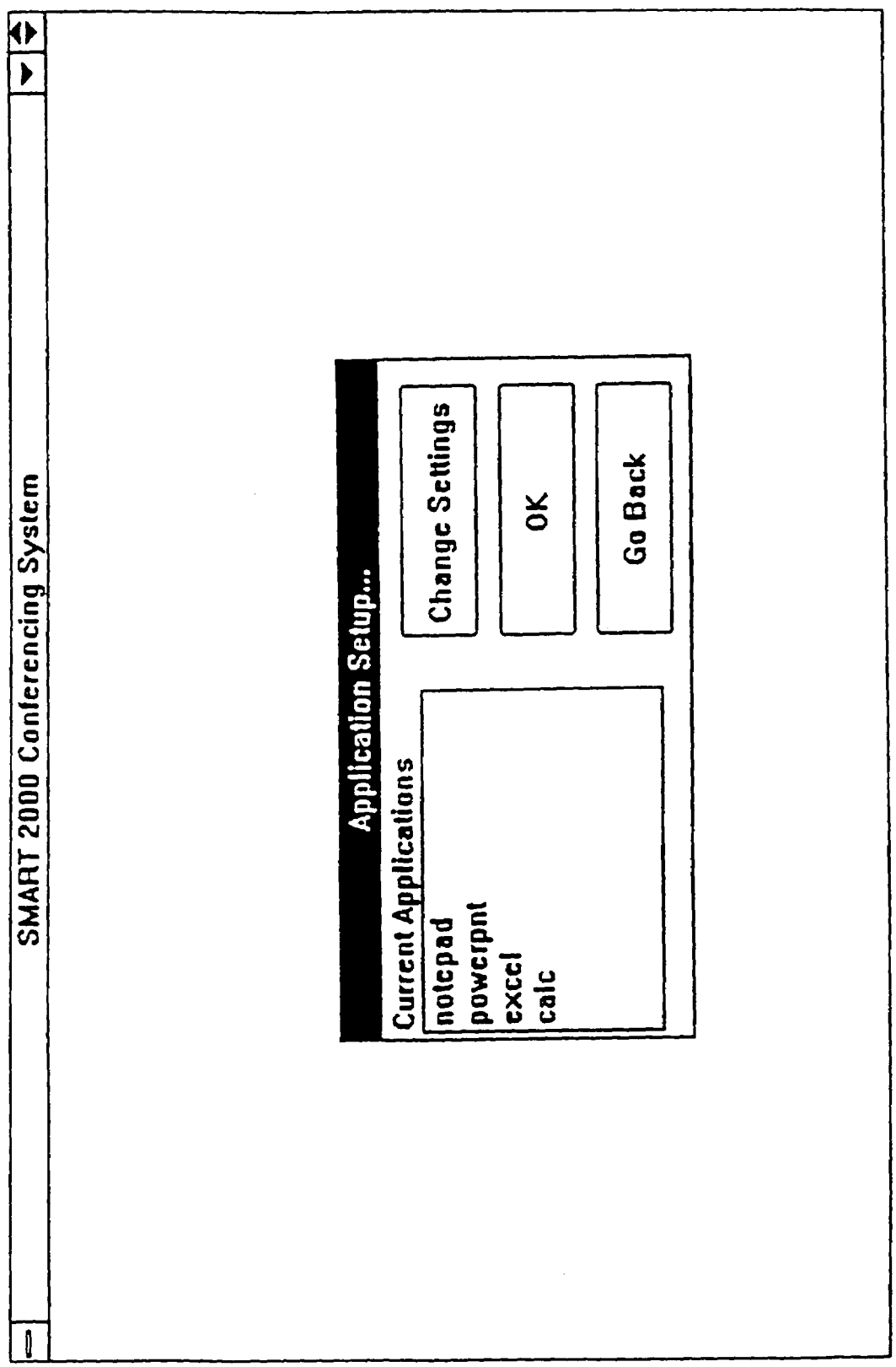

The applications set-up operation (1102) is used to check to ensure that the requested applications are valid. Applications that are accepted as valid are then presented to the user for acceptance (1103), as shown in the screen display of FIG. 15*d*. If the applications list is not accepted, control is passed back to the applications list input function (1101).

Acceptance of the applications list (1104) causes the applications list to be saved (1104) for later use.

After the applications list is saved, the user is asked for the conference operating mode. At this point, the conference operating mode is determined (1106).

There are two basic modes of operation: the master mode and the participant mode. The master mode unit is responsible for the list containing information on each of the participants, as well as establishing the network structure and establishing contact with each of the participant machines. In addition, the master system is responsible for the conduct of the conference.

Participant mode is the second mode of operation. Only a limited set of control options are generally available to the participant.

If the master mode is selected (1106), control is passed to the master mode set-up procedure (1300). Selection of participant mode causes participant set-up procedures to be invoked (1400).

Figure 16:
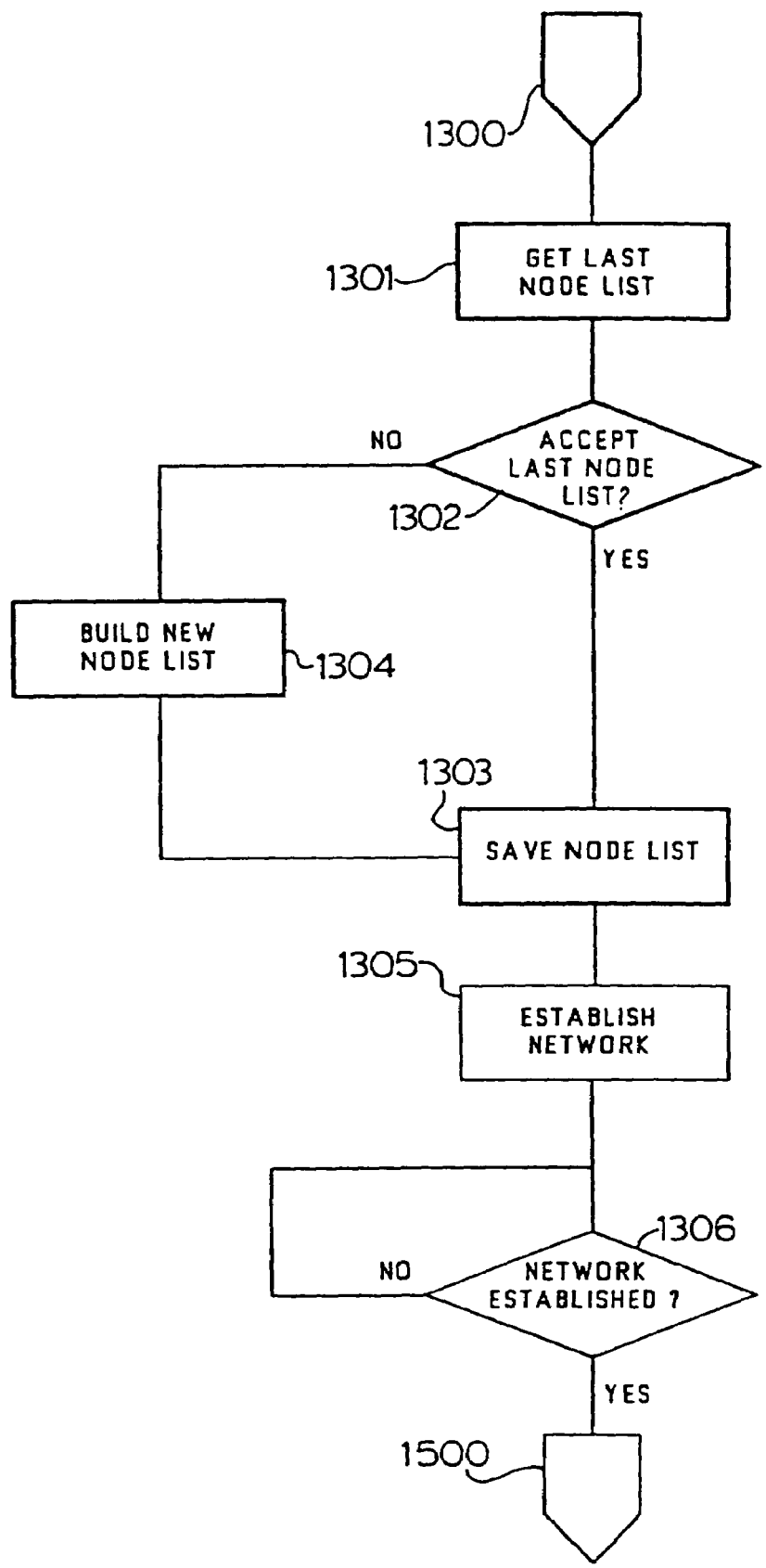
FIG. 16 is a flow chart showing master mode set up according to the present invention.

FIG. 16 represents the master mode set-up procedure. On entry (1301), the last node (participant) list is read into the program from resident memory of computer 5. The user then has the option of accepting or rejecting the node list (1302). If the node list is accepted (1302), the list is then saved (1303). If the node list is rejected (1302), then the user builds a new node list (1304). The new node list is then saved (1303).

Figure 16A:
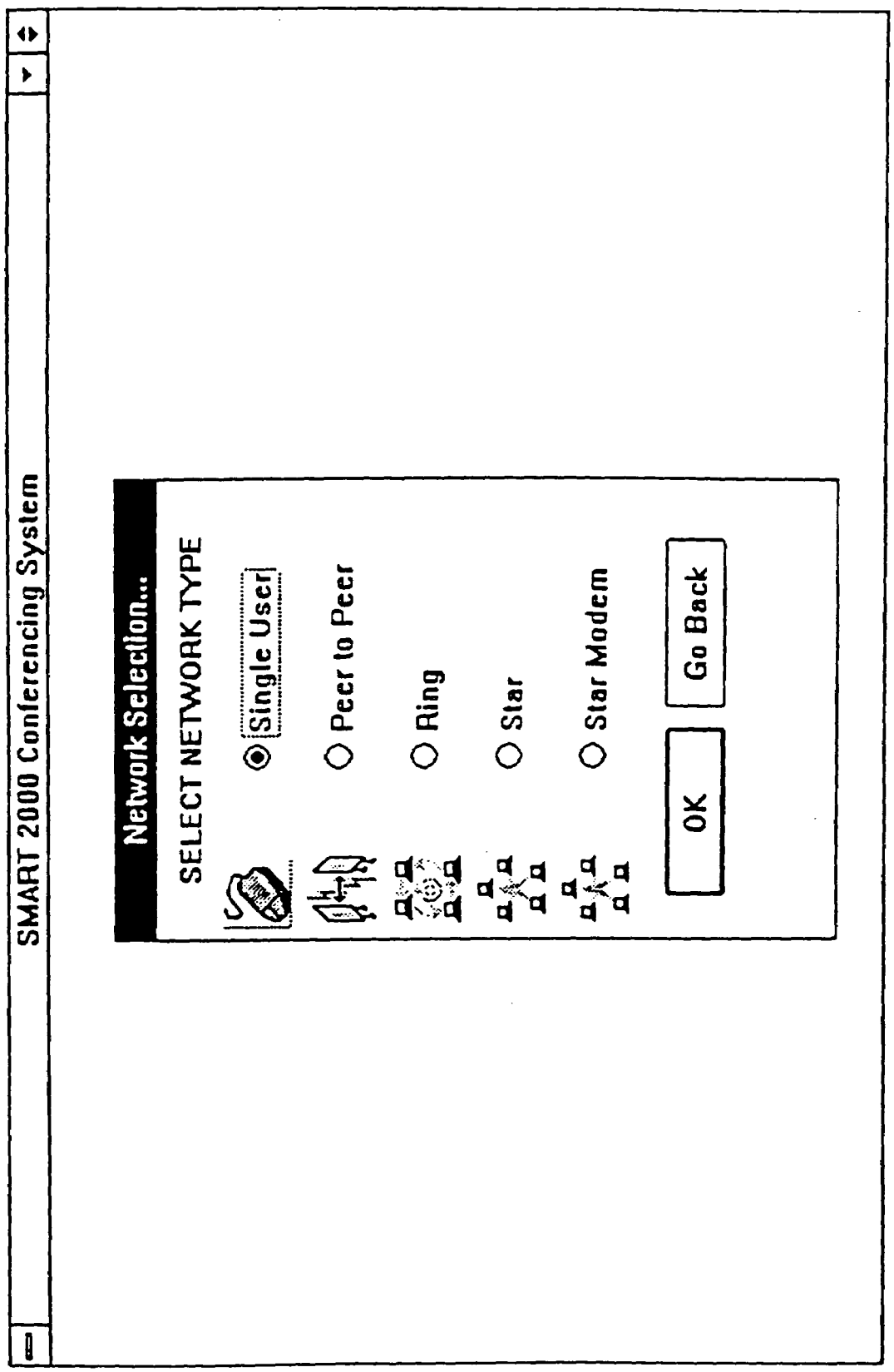
FIG. 16a shows the screen display for use during conference mode selection.

FIG. 16*a* depicts the screen display presented by the system to the user for the purpose of selecting and saving a new node list.

After the node list has been accepted and saved, the nodes listed are contacted and the network is established (1305). Specifically, the master node or computer 5 places calls via modem and telephone lines (not shown) to the other participants in the network in a well known manner. Alternatively, radio, microwave or other communication may be effected. Program flow then enters a wait cycle until the network is established (1306). Once the network is operational (1306), the main program loop is entered (1500).

Figure 17:
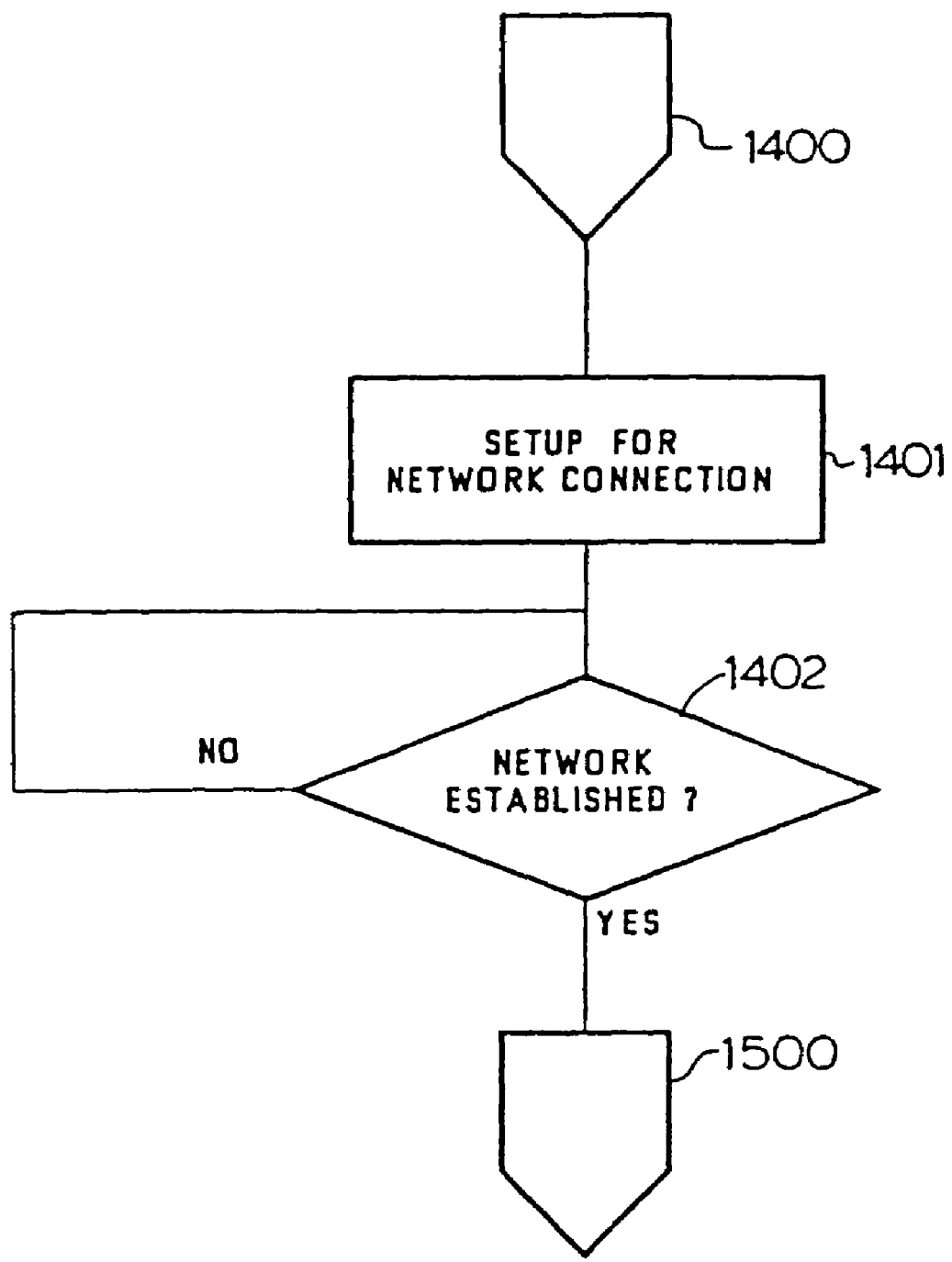
FIG. 17 is a program flow chart showing participant set up according to the present invention.

FIG. 17 shows the participant mode set-up procedure. On entry (1401), the selected network is prepared for connection (1401) with the conference master. From there, a wait cycle is entered into until the network is established (1402). After the network is established (1402), the main program loop is entered (1500) for the participant machine.

Figure 18:
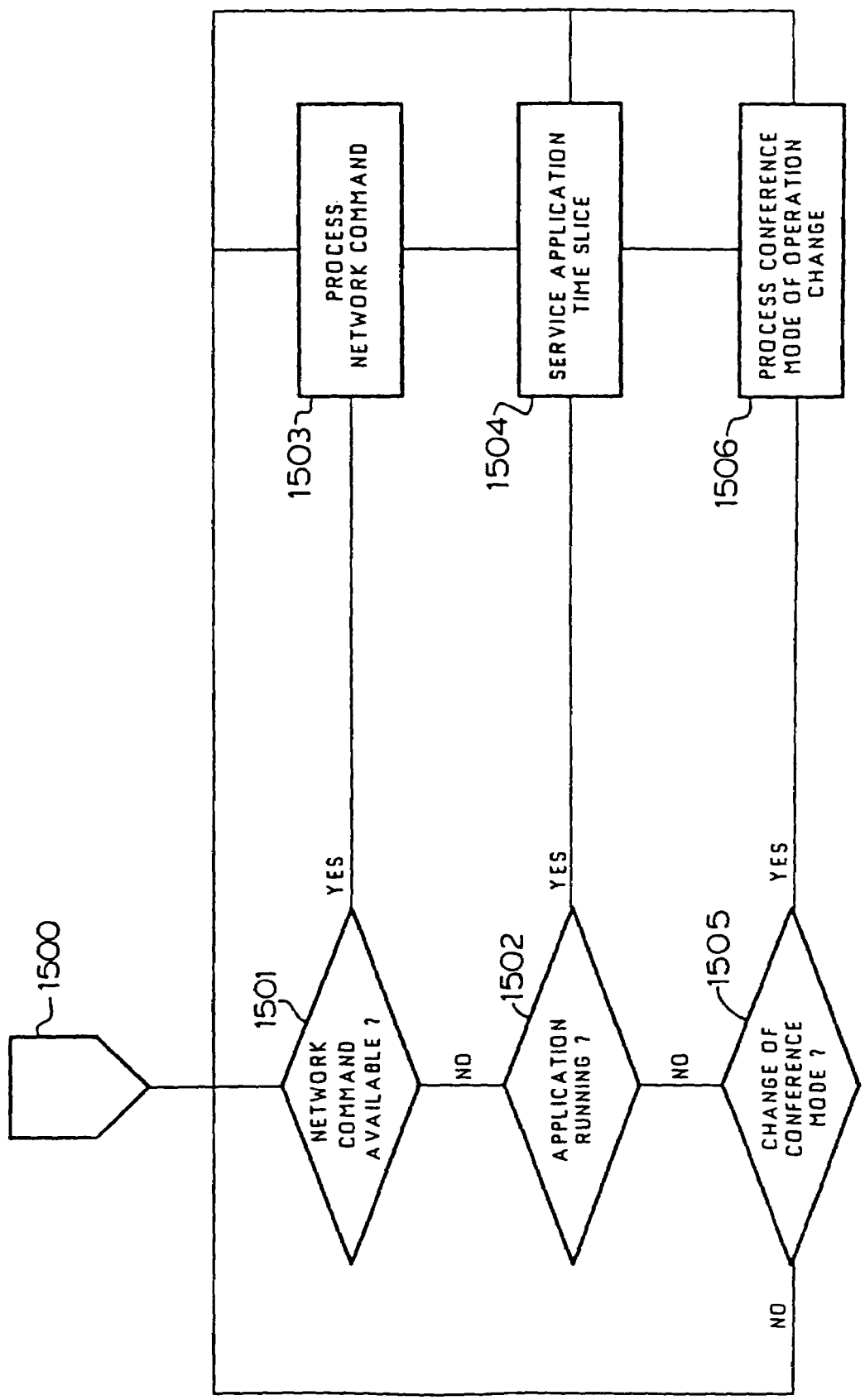
FIG. 18 is a program flow chart showing the main program loop according to the present invention.

FIG. 18 outlines the main program loop structure. This structure is responsible for the continuous service of the conference network in the background while the main application program runs in the foreground on each of the systems forming the conference. It is necessary for this loop to continuously process network events, local events and special mode change operations. Network events are defined as commands received from or status changes related to the network interface. Network commands are items such as synchronization messages, command information being passed from one machine to another, or any other type of information transfer that occurs while the network is established. Status change information is defined as information related to the network status such as data errors, loss of connection, etc.

Local events are events generated by the local application for keyboard, mouse, touch-sensitive screen 1, digitizer pad, etc. Generally, local events are sent out on the network to each of the participant nodes, depending on the network configuration and the operating mode, by the node generating the event. Examples of mode change events include events that transfer master control to another node, changing the operating mode of a node, or any other special type of event that occurs outside the realm of the current application.

On entry (1500), a check is made for any pending network events (1501). If a network event is found (1501), it is passed to the network event process operation (1503) where it is acted upon.

After processing, the main loop is re-entered (1501). In the event that no network events are available (1501), a test is made to determine if an application event has occurred (1502). If so, the event is allowed to be processed (1504) and the loop is re-entered (1501). If no application events are present (1502), a test is performed for a special mode change event (1505). If no mode change event is present, the control passed back to the network event checker (1501). If a mode change event was found, it is processed (1506) and control is returned to the network event checker (1501).

According to the preferred embodiment of the invention, the MicroSoft 3.0 Windows™ program environment is used operating under the MS-DOS operating system. Under this operating environment, all event occurrences are handled by interrupting the computer 5 and having specific events serviced. In the case of the present invention, there are several possible sources of interrupts that can occur during the operation of the program. For example, interrupts can be generated by the touch-sensitive screen, keyboard or mouse input to the computer 5, or via the network interface with remote nodes. Each of these interrupts in the procedures that are used to service them are discussed in greater detail below.

Figure 19:
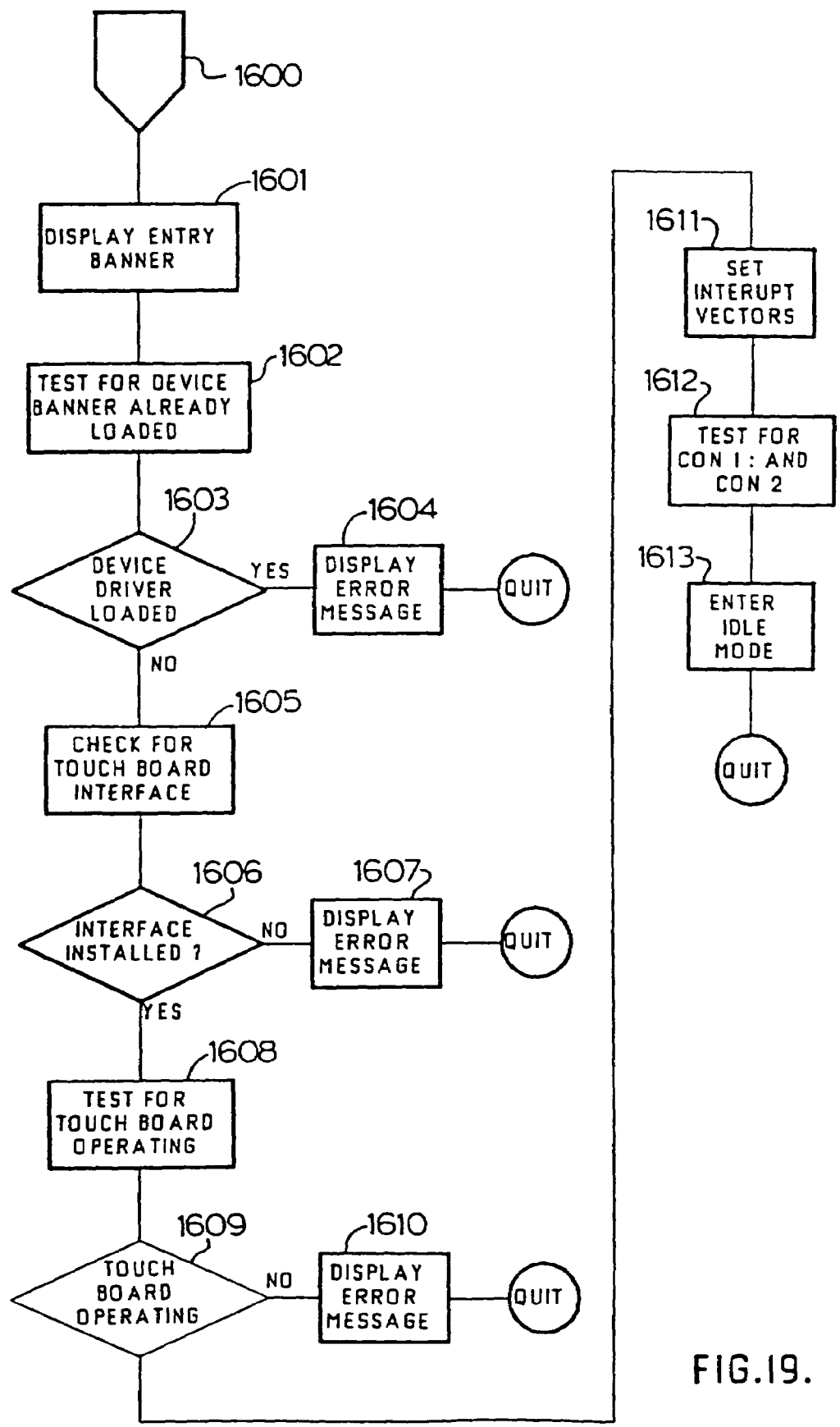
FIG. 19 is a program flow chart showing the device driver loader routine according to the present invention.

With reference to FIG. 19, a memory resident device driver is loaded. The device driver checks and sets up the operating environment and then exits leaving in place the software required to handle the low level support of the conference system. MicroSoft Windows™ 3.0 is subsequently started and the main part of the program is invoked. Thus, when the main program is started, the previously loaded device driver also becomes active. The interrupt service details that follow in the discussion below, cover the interaction between the device driver, the device being serviced, and the main program.

On entry (1600), the program identification banner is presented on the display monitor (1601). A test is then done to determine if the device driver has already been loaded and is currently operational (1602). If the device driver has already been loaded (1603), an error message is displayed (1604) and the program is exited without being loaded.

If the device driver has not been loaded (1603), a test is done to determine if the touch-sensitive screen interface 3 is installed (1605). If the touch-sensitive screen interface 3 is not detected (1606), an error message is displayed (1607) and the program is exited without loading.

If the touch-sensitive screen interface 3 is detected (1606), a test is done to determine if the interface 3 and the touch-sensitive screen 1 are operating correctly, (1608). If not, an error message is displayed (1610) and the program is exited.

If the touch-sensitive screen is operating (1609), then the driver is loaded and the interrupt vectors are set (1611), a test is made for the presence of two serial ports (1612) and the driver is put into an idle mode (1613).

After the initializations are complete, the driver exits, leaving the interrupt service routines in place and returns control to the operating system (MS-DOS).

The touch-sensitive screen interrupt service routine is invoked whenever any event occurs relating to the screen 1. This includes touching the screen, picking up a pen, pressing a button, or any other operation performed by the screen 1 or its interface 3.

Figure 20:
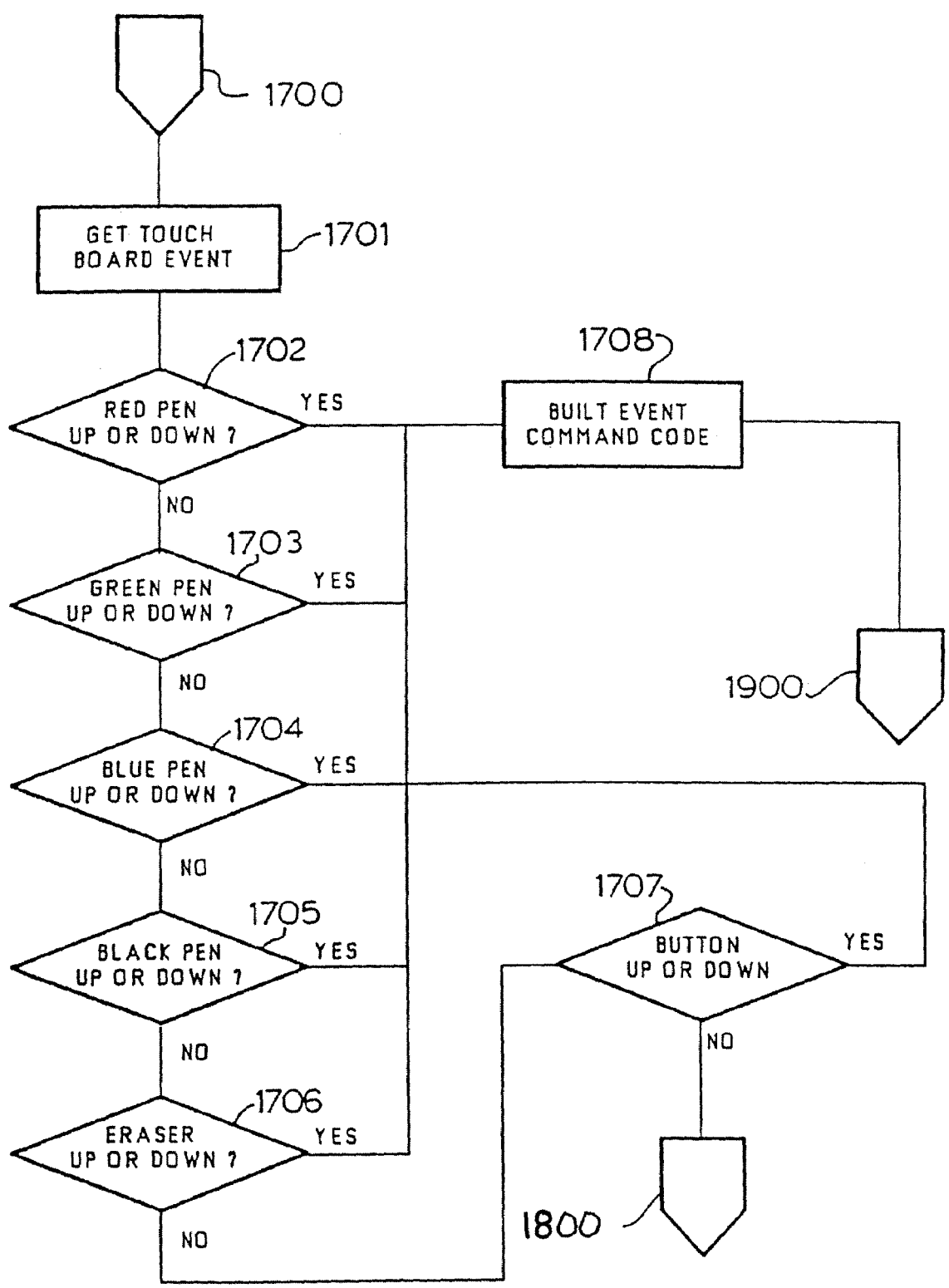
FIG. 20 is a program flow chart showing the touch board interrupt service entry point routing according to the present invention.

FIG. 20 depicts a flowchart with a touch-sensitive screen interrupt service routine entry point. On entry (1700), the touch-sensitive screen event is read from the interface 3. The event is checked for a change in pen status (1702, 1703, 1704 and 1705), erase status (1706) or button status (1707). If the event is any one of the aforementioned, an event command is generated based on the particular event.

Figure 21:
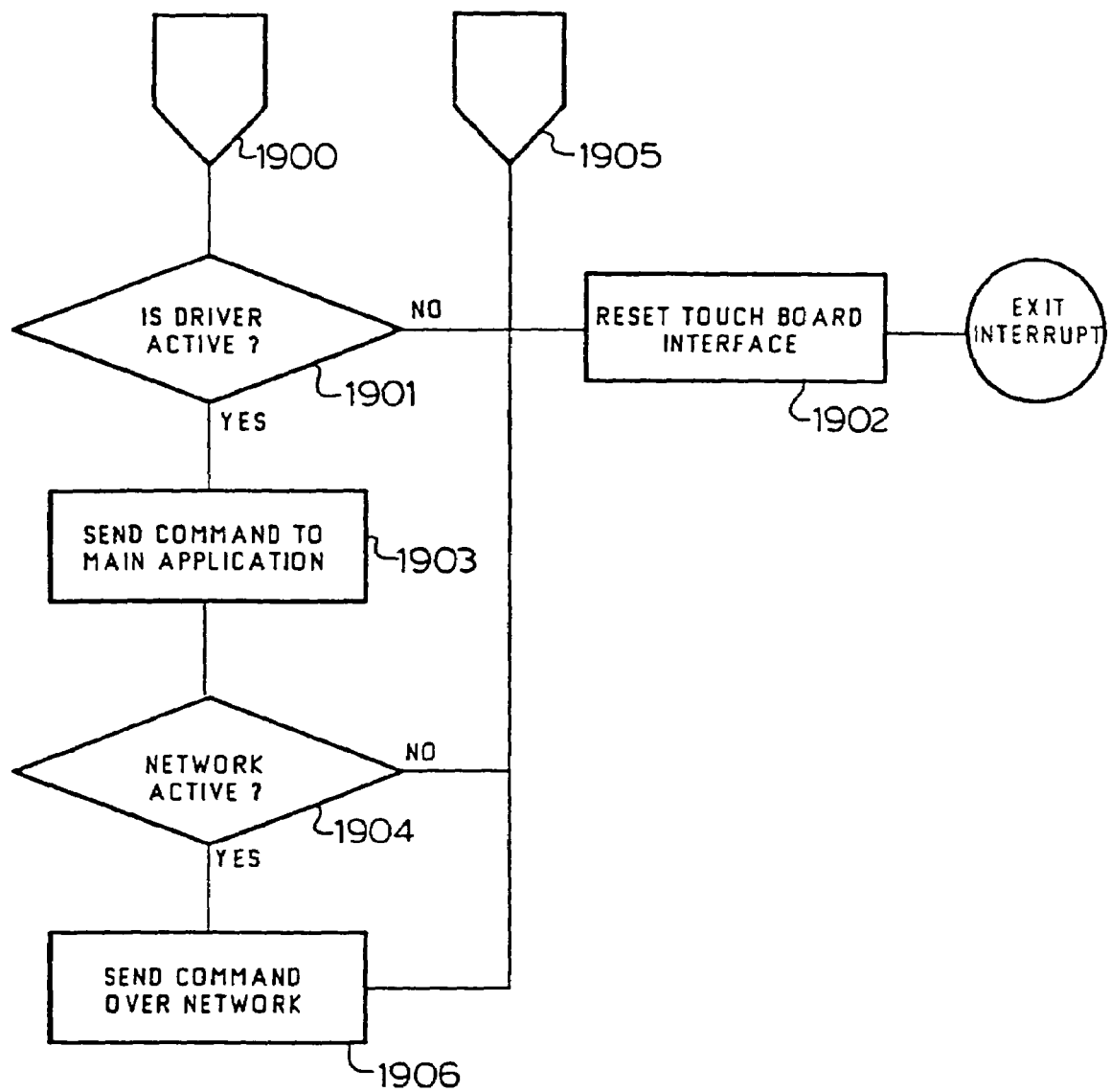
FIG. 21 is a program flow chart showing the touch board command handler according to the present invention.

This event code is then transmitted to the command handler (1900) shown in FIG. 21. A check is made using the command handler routine to determine if the driver is active (1901). If not, the interface 3 is reset and the command is ignored. If the driver is in an active state, the command is transmitted to the main application program where the status change is noted and, in the case of a button event, processed according to the current button function definition. In a successful prototype of the invention, the button was used to indicate a save screen request.

After transmitting the command to the main application program, a test is conducted to determine if the network is active (1904). If it is, the command is transmitted over the network to all other nodes so that nodes on the network track each other. If the network is not active, the interface 3 is reset (1902) and the interrupt service routine is exited. Upon transmitting the command over the network, a completion sequence (1902) commences.

Figure 22:
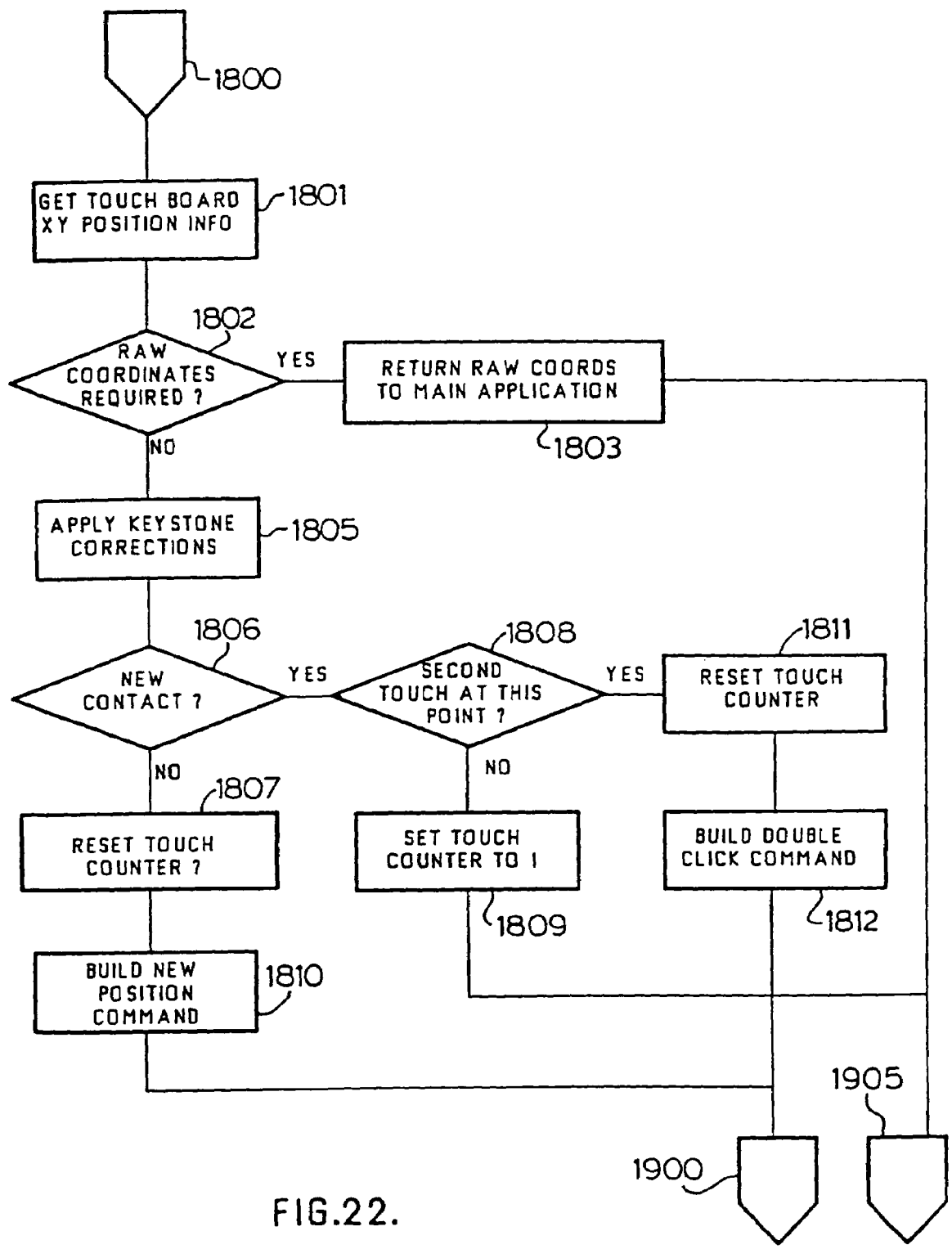
FIG. 22 is a program flow chart showing the touch board position processor routing according to the present invention.

In the event that the event associated with touch sensitive screen 1 is not status change, processing flow passes to the touch-sensitive screen position processor (1800) as shown in FIG. 22. The X and Y positions of the touch point on screen 1 are read from the interface 3 (1801). A test is then conducted to determine if the main application program requires raw position information (1802). Normally, raw position information is only required during the procedure of image alignment and the generation of keystone correction factors discussed above. If raw coordinate information is required (1802), then this information is transmitted to the main application software (1803) and control is passed to the touch-sensitive screen command handler (1905) where the interface 3 is reset (1902) and the interrupt service routine is exited.

If raw coordinates are not required by the main application software (1802), then keystone correction is applied to the position information (1805). As discussed above, keystone correction is the procedure by which positional information from the trapezoidal image, caused by imperfect vertical alignment between the image projector 7 and the touch-sensitive screen, is compensated for. The compensation process uses the positional information received from the touch-sensitive screen 1 and corrects the coordinate data along the X axis so that is appears, to the main application software, to be at the point where it would be if the projected image were rectangular.

At this stage, a test is conducted to determine if the positional information represents a new contact point (1806). This would occur if the last positional coordinate received represented a release event. If the current point represents a new contact point, then a check is made to determine if this is the second time that the touch-sensitive screen 1 has been touched at the same point (1808). If it is, the touch counter is reset (1811), and a "double click" command is generated (1812). A double click command is interpreted, by the Windows™ program, as a function selection request, normally invoked by two touches in succession on a picture icon that represents a program function. The double click command is then transmitted to the touch-sensitive screen command handler. Next, a check is conducted to determine if the driver is active (1901). If not, the interface 3 is reset and the command is ignored. If the command is in an active state, the command is transmitted to the main application software and processed.

After transmitting the command code to the main application software, a test is conducted to determine if the network is active (1904). If it is, the command is transmitted over the network to the other nodes so that all of the nodes on the network track each other. If the network is not active, the touch-sensitive screen interface 3 is reset (1902) and the interrupt service routine is exited. Upon sending the command over the network, the completion sequence (1902) commences.

If the current touch point is determined to be the first contact at a given point on the screen 1 (1808), then the touch counter is set to "1", indicating the first contact (1809). Control is then passed to the touch-sensitive screen command handler (1905) where the touch board interface 3 is reset (1902) and the interrupt service routine is exited.

If the current contact point is determined not to be a new contact point (1806), then the touch counter is reset (1807) and a new position command is built. (1810). The new position command is sent to the touch-sensitive screen command handler (1900). If not, the interface 3 is reset and the command is ignored. If the driver is in an active state, the command is transmitted to the main application software and processed.

After passing the command code to main the application software, a test is conducted to determine if the network is active (1904). If it is, the command is transmitted over the network to the other nodes so that all of the nodes on the network track each other. If the network is not active, the touch-sensitive screen interface 3 is reset (1902) and the interrupt service routine is exited. Upon sending the command over the network, the completion sequence (1902) commences.

As discussed above, according to the preferred embodiment, the main application software runs under the well known MicroSoft Windows™ 3.0 software environment. Windows™ 3.0 supports the simultaneous operation of multiple programs. This characteristic is exploited by the main application software in the present invention.

When another application is running, the main application software for this invention remains operating in a background mode. As such, whenever a command event is passed to the main application software it is acted upon. In the case of a pen graphics command, a line of the currently selected colour and width is projected directly on the screen 1, thereby appearing to be drawn on the current display on whatever application is running in the foreground. The principle of simultaneous program operation provided by the Windows™ environment allows for the system of the present invention to coordinate the operation of the same user application programs at different sites on different computers.

Most of the command codes referred to above are transferred in six byte packages. It should be noted, however, that the data blocks need not necessarily be six bytes long and that the structure can vary depending on data type variations. The structure of the command code is shown below in table 1.

TABLE 1

| BYTE | FUNCTION |
| --- | --- |
| 1 | command type code |
| 2–3 | first data word |
| 4–5 | second data word |
| 6 | network node identification |

The command type code simply specifies the type of command. This can be, for example, RED PEN UP, LINE TO POSITION, BOARD FINGER CONTACT, etc. The first and second data words are generally used to transmit X and Y coordinate data. The network node identification byte is used to identify a machine that is the source of the command. At the start of a network link-up, each node is assigned an identification number. This identification subsequently allows each other machine in the network to track the command events properly.

FIGS. 23a to FIG. 23d show example application graphics as projected on the screen 1, and the manner in which pen graphics are integrated with the graphics image. For example, FIG. 23a shows a screen generated by the "Smart Notepad" application. As can be seen, the network is set-up for stand-alone use, and various options are provided for graphics line widths, application selection, help menu, etc. In FIG. 23b, the user has entered certain script graphics (i.e. two) circles and an arrow connecting them, by means of simply drawing on the projected image applied to screen 1. FIG. 23c shows a graphic image generated by a calculator application program, as it appears projected on screen 1, and FIG. 23d shows user applied pen graphics as drawn and re-projected onto the screen 1. As discussed above, the screen graphics depicted in FIGS. 23a to 23d, can be simultaneously projected onto the touch-sensitive screens located at any number of network connected conference sites (FIG. 2), resulting in a truly interactive conferencing display system. The screen displays shown in FIGS. 23a to 23d were saved using the "screen save" function discussed above.

In summary, according to one aspect of the invention, an interactive display system is provided for overlying graphics applied to a display surface onto the graphics output of an application running in the foreground, and to allow user input to the application program by means of a touch-sensitive screen. According to another aspect of the invention, multiple users may be connected in conference to allow for the sharing of information in an interactive graphics environment. Furthermore, according to an additional aspect of the invention, each of the identical simultaneously running application programs at the multiple sites can be remotely controlled by any other one of the sites, by means of the local touch-sensitive screens and associated conferencing software.

Variations and modifications of the present invention are contemplated. For example, although the described embodiment utilizes an LCD panel and overhead projector as separate unit, the LCD light source (i.e. projector) may be incorporated into an integrated unit. All such modifications and variations are believed to be within the sphere and scope as defined by the claims appended hereto.

The embodiment of the invention in which an exclusive property or privilege is claimed are defined as follows:

1. An interactive display system, comprising:
   a) a touch-sensitive display screen for sensing pressure applied thereto and in response generating control signals indicating locations of said applied pressure, b) structure configured to receive said control signals and in response generate graphic images to be projected onto said touch sensitive display screen at said locations, c) a computer for executing one or more applications programs in a multi-tasking environment and in response generating screen video displays, said computer being connected to said touch-sensitive display screen, d) a driver in said computer for receiving said control signals and in response generating a command to a selected one of said applications programs for updating said screen video displays in accordance with said applied pressure to said touch-sensitive display screen, e) a projector connected to said one or more computers for receiving and projecting said screen video displays onto said display screen, and f) structure for modifying location data in said command to thereby align said screen video displays with the location of said pressure applied to said display screen, wherein said command includes data for identifying horizontal and vertical coordinates of the location of said pressure applied to said display screen, and wherein said structure for modifying comprises a software routine for generating via said projector a plurality of alignment images onto said display screen at predetermined locations, detecting user applied pressure on said display screen at the respective locations of said images, and in response calibrating said horizontal and vertical coordinates to compensate for keystoning caused by planar misalignment between said projector and said display screen.

2. An interactive display system, comprising:

a) a touch-sensitive display screen for detecting pressure applied thereto and in response generating control signals indicating locations of the applied pressure, b) a computer for executing one or more application programs in a multi-tasking environment and in response generating screen video displays, said computer being coupled to said touch-sensitive display screen, c) a driver in said computer, for receiving said control signals from said touch sensitive display screen and in response generating a command to a selected one of said application programs updating said screen video displays in accordance with the pressure applied to said touch-sensitive display screen, d) a projector coupled to said computer for receiving and projecting said screen video displays onto said touch-sensitive display screen, and e) alignment structure, in said computer, to adjust location data in said command to thereby align said screen video displays with the location of said pressure applied to said touch-sensitive display screen, wherein the command includes data for identifying coordinates of the location of the pressure applied to said touch-sensitive display screen, and wherein said alignment structure includes a software routine for (i) projecting via said projector a plurality of predetermined images onto said touch-sensitive display screen, (ii) detecting user applied pressure at the respective locations of said predetermined images, and (iii) in response calibrating said coordinates to compensate for keystoning caused by planar misalignment between said projector and said touch-sensitive display screen.

3. An interactive display apparatus, comprising:

a touch-sensitive display screen providing a display surface for projection of a display image thereon and capable of generating, in response to pressure applied to the display surface, a location indication representing the location on the display surface where the pressure is applied; and an alignment routine configured to:

(1) cause at least four alignment marks to be displayed via the display image;

(2) receive for each one of the alignment marks a respective location indication representing a location on the display surface where pressure is applied to the display surface proximate that alignment mark;

(3) use the respective location indications corresponding to the at least four alignment marks to generate a mapping between locations on the display surface and locations within the display image,
wherein the mapping compensates for keystoning of the display image caused by non-orthogonal projection of the display image onto the display surface; and (4) use the mapping to correct coordinates of a subsequently-received location indication to a location within the display image where the subsequently-received location indication would be if the projected display image were rectangular.

4. The interactive display apparatus of claim 3, wherein the mapping generated by the alignment routine compensates for keystoning of the display image without physical adjustment of the touch-sensitive display screen.

5. The interactive display apparatus of claim 3, wherein the alignment routine is configured to cause exactly four alignment marks to be displayed via the display image.

6. The interactive display apparatus of claim 3, wherein the at least four alignment marks are displayed sequentially.

7. The interactive display apparatus of claim 6, wherein each alignment mark is displayed proximate a corner of the display image.

8. The interactive display apparatus of claim 3, wherein the at least four alignment marks are displayed within the display image.

9. The interactive display apparatus of claim 3, wherein the mapping is stored.

10. The interactive display apparatus of claim 3, wherein the alignment routine is configured to use a previously-stored mapping to compensate for keystoning in response to user input.

11. The interactive display apparatus of claim 3, wherein the alignment routine is executed during initialization of the touch-sensitive display screen.

12. The interactive display apparatus of claim 3, wherein the alignment routine is configured to be executed in response to user input.

13. The interactive display apparatus of claim 3 in combination with a projector configured to project images onto the display surface of the touch-sensitive display screen.

14. The interactive display apparatus of claim 3 in combination with a computer in communication with the touch-sensitive display screen.

15. The combination of claim 14, wherein the computer is configured to execute an application program in a windowed operating system environment, and
wherein the application program generates a display image for projection onto the display surface of the touch-sensitive display screen.

16. The combination of claim 14, wherein the computer is configured to pass the location indications received from the touch-sensitive display screen to the application program.

17. A method of interacting with a touch-sensitive display screen, the touch-sensitive display screen providing a display surface for projection of a display image thereon, the method comprising the steps of:
(a) generating, in response to pressure applied to the display surface, a location indication representing the location on the display surface where the pressure is applied;
(b) causing at least four alignment marks to be displayed via the display image;
(c) receiving for each one of the alignment marks a respective location indication representing a location on the display surface where pressure is applied to the display surface proximate that alignment mark;
(d) generating a mapping between locations on the display surface and locations within the display image, using the respective location indications corresponding to the at least four alignment marks,
wherein the mapping compensates for keystoning of the display image caused by non-orthogonal projection of the display image onto the display surface; and
(e) using the mapping to correct coordinates of a subsequently-received location indication to a location within the display image where the subsequently-received location indication would be if the projected display image were rectangular.

18. The method of claim 17, wherein the mapping generated by step (d) compensates for keystoning of the display image without physical adjustment of the touch-sensitive display screen.

19. The method of claim 17, wherein exactly four alignment marks are caused to be displayed via the display image in step (b).

20. The method of claim 17, wherein each alignment mark is displayed proximate a corner of the display image.

21. The method of claim 17, wherein the at least four alignment marks are displayed within the display image.

22. The method of claim 17, further comprising the step of:
storing the mapping.

23. The method of claim 17, further comprising the step of:
using a previously-stored mapping to compensate for keystoning in response to user input.

24. The method of claim 17, wherein at least steps (b)–(d) are executed during initialization of the touch-sensitive display screen.

25. The method of claim 17, further comprising the step of:
executing steps (b)–(d) in response to user input.

26. The method of claim 17, further comprising the step of:
projecting images onto the display surface of the touch-sensitive display screen.

27. The method of claim 17, further comprising the steps of:
executing an application program in a windowed operating system environment; and
generating a display image by the application program for projection onto the display surface of the touch-sensitive display screen.

28. The method of claim 27, further comprising the step of:
passing the location indications received from the touch-sensitive display screen to the application program.

29. An interactive display system, comprising:
a display screen,
wherein the display screen provides a display surface for projection of a display image thereon, and
wherein the display screen is capable of sensing pressure applied to the display surface, and, in response, generating a location indication representing the location on the display surface where the pressure is applied; and
a computer-readable medium containing a computer program for performing an alignment routine,
wherein the computer program performs the steps of:
(a) causing at least four alignment marks to be displayed via the display image;
(b) receiving for each one of the alignment marks a respective location indication representing a location on the display surface where pressure is applied to the display surface proximate that alignment mark;
(c) generating a mapping between locations on the display surface and locations within the display image, using the respective location indications corresponding to the at least four alignment marks,
wherein the mapping compensates for keystoning of the display image caused by non-orthogonal projection of the display image onto the display surface; and
(d) using the mapping to correct coordinates of a subsequently-received location indication to a location within the display image where the subsequently-received location indication would be if the projected display image were rectangular.

* * * * *